US010970075B2

(12) United States Patent
Takata et al.

(10) Patent No.: US 10,970,075 B2
(45) Date of Patent: Apr. 6, 2021

(54) ARITHMETIC PROCESSING APPARATUS, INFORMATION PROCESSING APPARATUS, AND CONTROL METHOD FOR ARITHMETIC PROCESSING APPARATUS

(71) Applicant: FUJITSU LIMITED, Kanagawa (JP)

(72) Inventors: Ryo Takata, Kawasaki (JP); Tomohiro Nagano, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 16/420,821

(22) Filed: May 23, 2019

(65) Prior Publication Data

US 2019/0384605 A1 Dec. 19, 2019

(30) Foreign Application Priority Data

Jun. 13, 2018 (JP) .............................. JP2018-113206

(51) Int. Cl.
*G06F 9/46* (2006.01)
*G06F 9/48* (2006.01)
*G06F 9/30* (2018.01)

(52) U.S. Cl.
CPC ........ *G06F 9/30134* (2013.01); *G06F 9/3001* (2013.01); *G06F 9/466* (2013.01)

(58) Field of Classification Search
None
See application file for complete search history.

(56) References Cited

U.S. PATENT DOCUMENTS

| 2009/0271435 | A1* | 10/2009 | Yako ................... G06F 16/2329 |
| 2015/0128142 | A1* | 5/2015 | Fahim .................. G06F 9/4881 |
| | | | 718/102 |
| 2017/0264579 | A1* | 9/2017 | Fang .................... H04L 67/2842 |
| 2018/0203609 | A1* | 7/2018 | Krueger ................ G06F 3/0685 |
| 2018/0203610 | A1* | 7/2018 | Krueger ................ G06F 3/0608 |
| 2018/0203638 | A1* | 7/2018 | Krueger ................ G06F 3/0631 |
| 2018/0203807 | A1* | 7/2018 | Krueger ............. G06F 12/0875 |

FOREIGN PATENT DOCUMENTS

| JP | 2011-013835 | 1/2011 |
| JP | 2014-021952 | 2/2014 |

* cited by examiner

*Primary Examiner* — Hyun Nam
(74) *Attorney, Agent, or Firm* — Fujitsu Patent Center

(57) ABSTRACT

An arithmetic processing apparatus includes a shift register configured to store a plurality of transactions each having one or more destinations; and a processor coupled to the shift register and configured to: select a first transaction among the transactions stored in the shift register based on a state of a destination of each of the transactions, determine whether or not the first transaction is issuable, select a second transaction based on destinations of the first transaction when it is determined that the first transaction is not issuable, issue the first transaction when it is determined that the first transaction is issuable, and issue the second transaction when it is determined that the first transaction is not issuable.

7 Claims, 23 Drawing Sheets

FIG. 6

| | SHIFT REGISTER | | | | | | BUSY NUMBER p_busy[N-1:0] | |
|---|---|---|---|---|---|---|---|---|
| REGISTER | ob[K-1] | ob[K-2] | ... | ob1 | ob0 | | | |
| REQUEST | #15 | #14 | ... | #1 | #0 | | | |
| DESTINATION LSU BITMAP p_ob{i}[N-1:0] | [N-1] | 1 | 0 | ... | 1 | 1 | [N-1] | 1 |
| | [N-2] | 0 | 0 | ... | 1 | 0 | [N-2] | 0 |
| | [N-3] | 0 | 1 | ... | 0 | 0 | [N-3] | 0 |
| | ⋮ | ⋮ | ⋮ | ... | ⋮ | ⋮ | ⋮ | ⋮ |
| | [0] | 0 | 0 | ... | 0 | 0 | [0] | 0 |

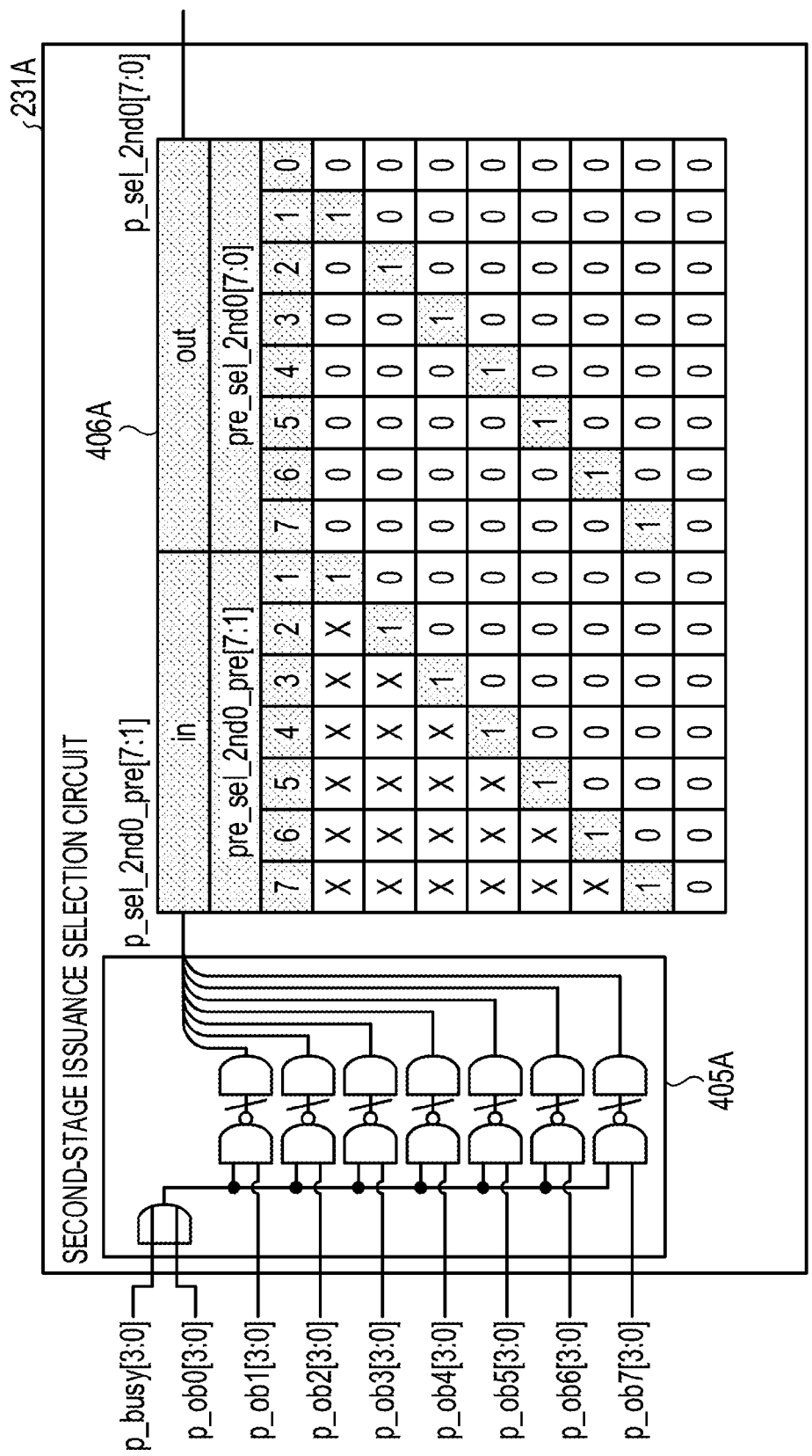

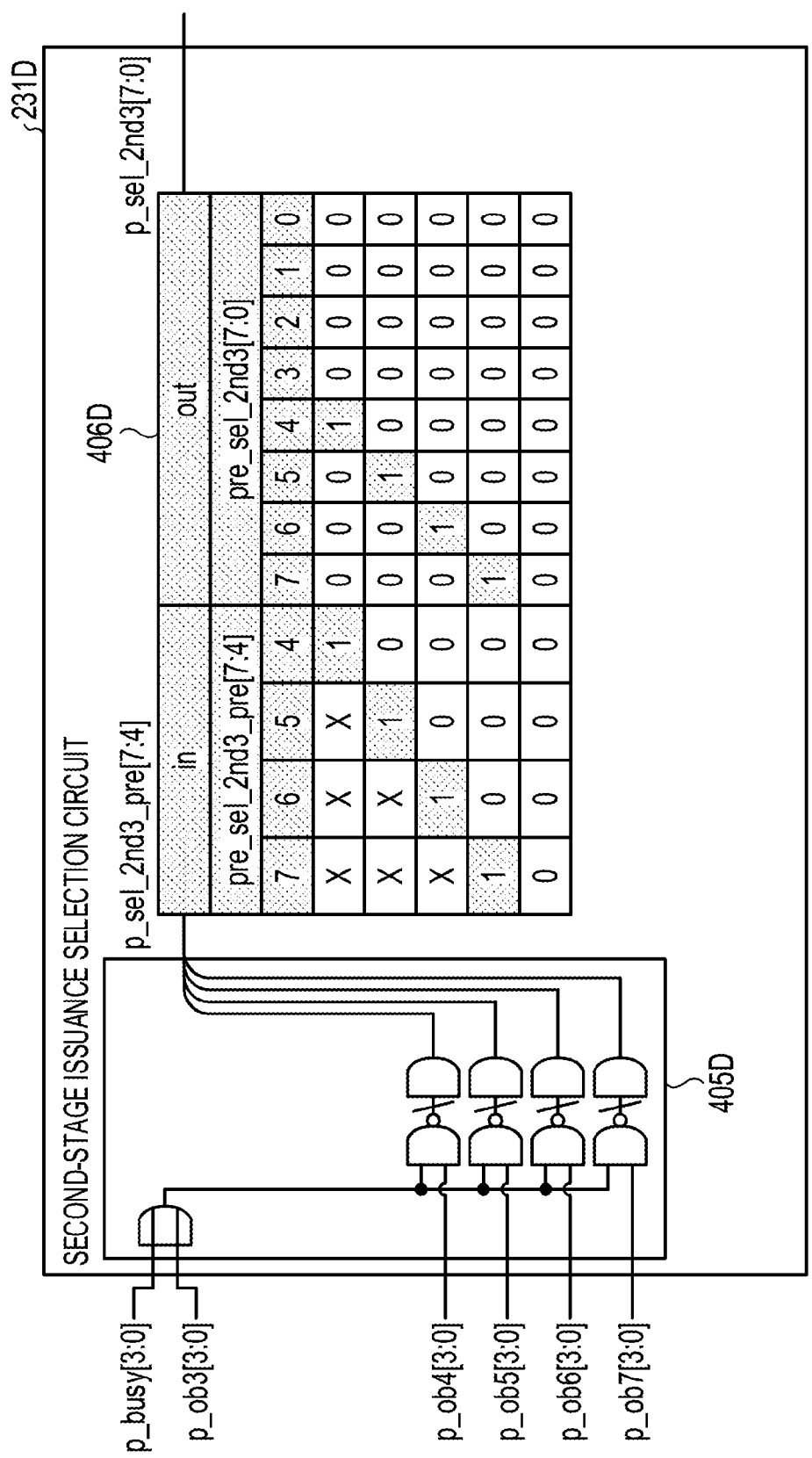

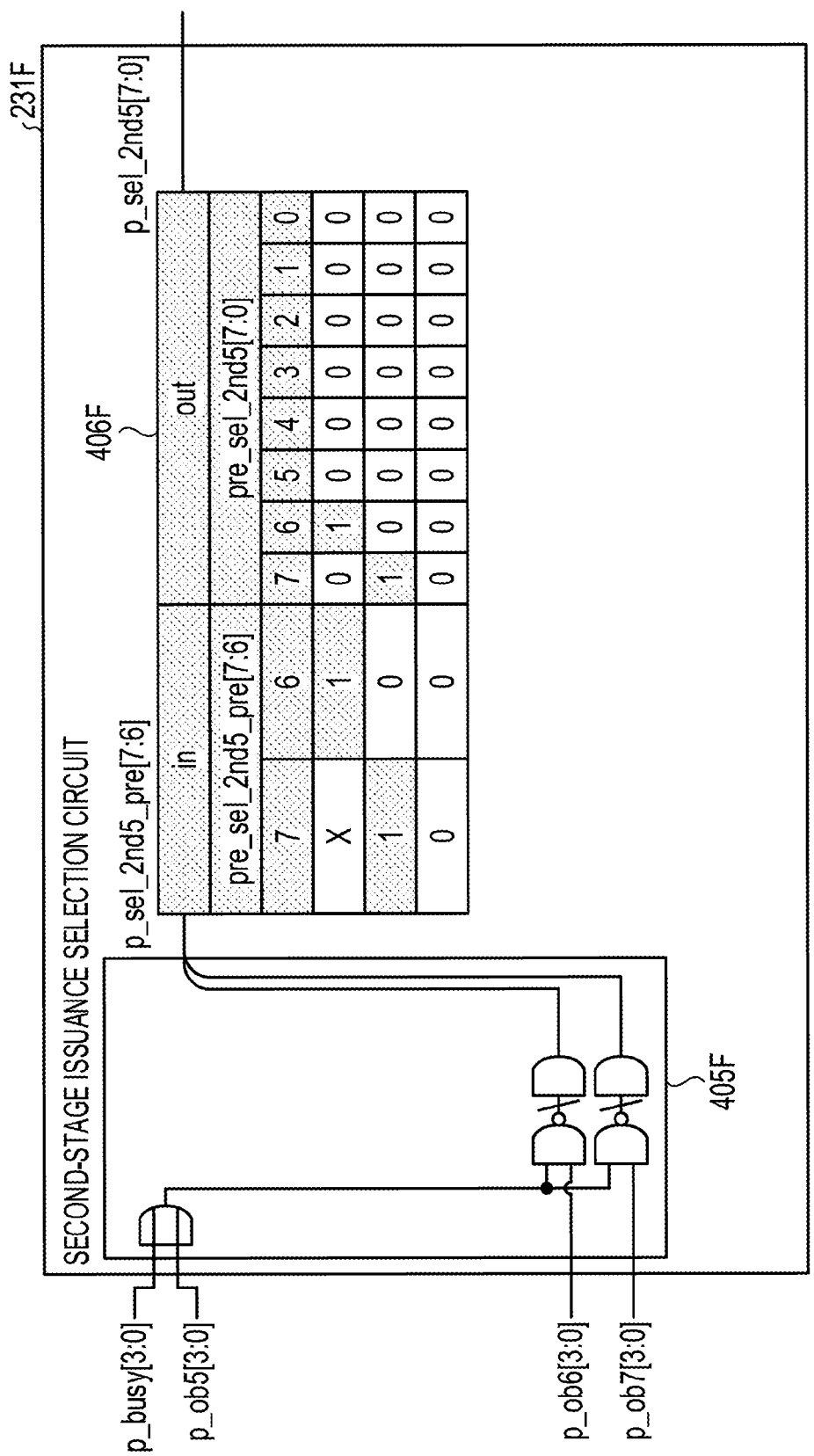

ARITHMETIC PROCESSING APPARATUS, INFORMATION PROCESSING APPARATUS, AND CONTROL METHOD FOR ARITHMETIC PROCESSING APPARATUS

CROSS-REFERENCE TO RELATED APPLICATION

This application is based upon and claims the benefit of the prior Japanese Patent Application No. 2018-113206, filed on Jun. 13, 2018, the entire contents of which are incorporated herein by reference.

FIELD

The embodiments discussed herein are related to an arithmetic processing apparatus, an information processing apparatus, and a control method for an arithmetic processing apparatus.

BACKGROUND

There is a multi-core arithmetic processor in which a plurality of cores each of which is an arithmetic processing circuit is coupled to a memory serving as a primary storage device and a memory access controller (MAC) unit. Each core includes a register file and an arithmetic execution unit (execution unit: EU). Further, each core is coupled to a corresponding load store unit (LSU). Each load store unit is coupled to one instruction issuance unit (instruction unit: IU). When the number of installed cores is large, it is common to share an access bus connecting to the main memory among the plurality of cores in consideration of the mounting of circuits.

An instruction issuance unit receives a memory access instruction which is an instruction to read or write data with respect to a memory, from an upper layer. Then, the instruction issuance unit decodes the acquired memory access instruction, and issues the memory access instruction to a load store unit, as a request. The load store unit performs a reading or a writing of data between the memory and the register file of the core according to the issued memory access instruction. The register file stores data acquired from the load store unit. The arithmetic execution unit performs an arithmetic operation using the data stored in the register file.

With one memory access instruction, requests may be issued to a plurality of load store units. In addition, a load store unit that is accessing the memory becomes a busy state, and cannot receive a new request.

In such a multicore arithmetic processor, in order to efficiently utilize all the load store units, the memory access instruction is executed in an out-of-order different from the appearance order of instructions in a program. Specifically, while the instruction issuance unit monitors busy signals from all the load store units, the instruction issuance unit arrange the requests of the memory access instruction in an appropriate order, and issues the requests to the load store units.

An overtaking instruction queue is used to implement the out-of-order execution of memory access instructions. The overtaking instruction queue refers to a queue described hereinbelow. The overtaking instruction queue stores the memory access instruction acquired from the instruction decoder in the instruction issuance unit, as a request, in a shift register. Then, the overtaking instruction queue selects an appropriate request from the requests stored in the shift register based on the busy signals of all the load store units, and issues the selected request to the load store unit. In the overtaking instruction queue, unlike a simple queue, a request arrived later can overtake a request arrived earlier. The overtaking instruction queue includes, for example, a K-stage shift register, an overtaking circuit, and two K input selectors.

In the K-stage shift register, requests are arranged without vacancy in an order from the head. The overtaking circuit selects and issues an issuance target request which is the headmost request among the requests satisfying an issuance permission condition that none of the destination load store units are in the busy state, in the requests stored in the K-stage shift register. The K-stage shift register erases the issued request and fills the requests in the head side such that the registers as entries do not become vacant from the head.

Here, in the related art of a queue control technique, a command is stored in a queue along with information indicating a selectable command range, and a command that needs to be issued within a performance guarantee period is preferentially selected and issued based on the information indicating the selectable command range. Further, in another related art, memory access requests are divided, a memory access request set with an issuable flag among the divided memory access requests is preferentially processed, and when one of the divided memory access requests is processed, the issuable flag is set in the other of the divided memory access requests.

Related techniques are disclosed in, for example, Japanese Laid-open Patent Publication Nos. 2014-021952 and 2011-013835.

SUMMARY

According to an aspect of the embodiments, an arithmetic processing apparatus includes a shift register configured to store a plurality of transactions each having one or more destinations; and a processor coupled to the shift register and configured to: select a first transaction among the transactions stored in the shift register based on a state of a destination of each of the transactions, determine whether or not the first transaction is issuable, select a second transaction based on destinations of the first transaction when it is determined that the first transaction is not issuable, issue the first transaction when it is determined that the first transaction is issuable, and issue the second transaction when it is determined that the first transaction is not issuable.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a view for explaining an issuance target request to be selected;

FIGS. 16A to 16G are circuit diagrams of a second-stage issuance selection circuit.

DESCRIPTION OF EMBODIMENTS

Figure 1:
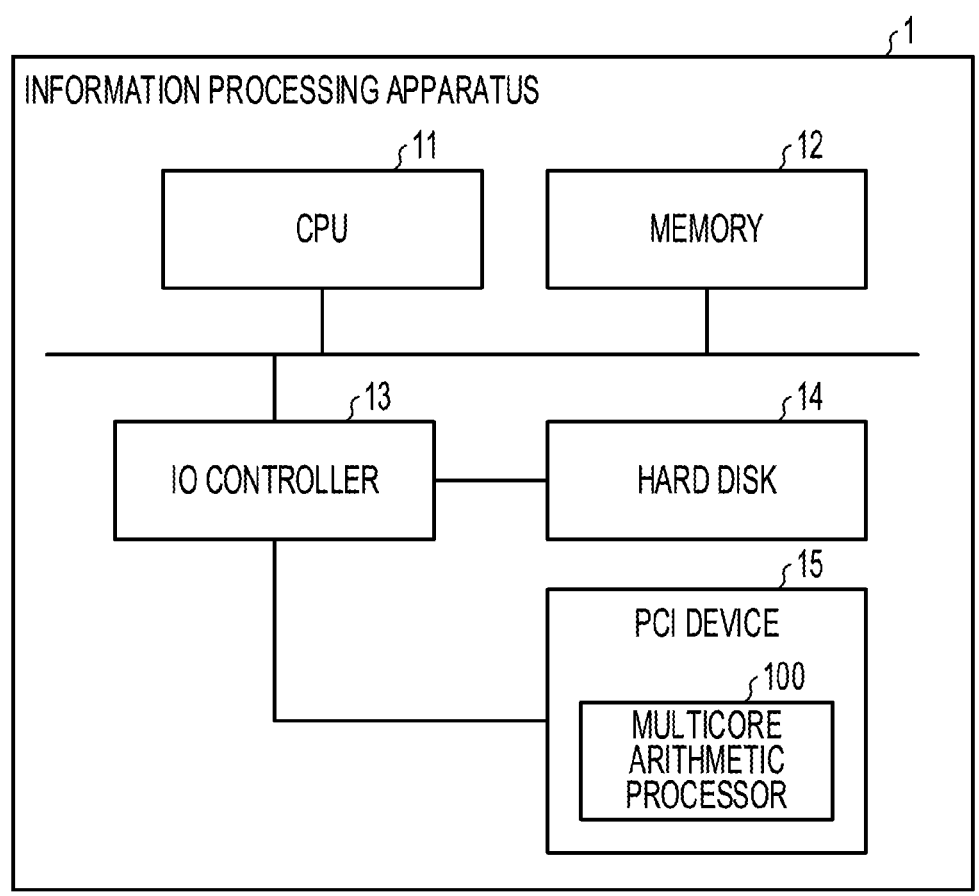
FIG. 1 is a view illustrating an example of a hardware configuration of an information processing apparatus according to an embodiment.

When the overtaking circuit of the related art is used, there arises a problem of a live lock in which a certain request is not issued for a long time or permanently. For example, a case where there are load store units 00 to 03 will be described. A first request addressed to the load store units 02 and 03 is stored in the head of the shift register. At this time, when the load store unit 03 is busy, the first request is not issued. Then, the headmost request among the requests that are present behind the first request and are not addressed to the load store unit 03 is selected. At this time, it is assumed that a request addressed to the load store units 01 and 02 has been selected and issued. Thereafter, when the memory access of the load store unit 03 is completed so that the busy state is released during the request processing of the load store units 01 and 02, a new request is to be selected. However, in this case, since the load store unit 02 is in the busy state, the first request is not issued and the headmost request among the requests that are present behind the first request and are addressed to the load store unit 03 is selected and issued. Accordingly, there is a concern that the state where the first request is not issued may continue for a long time. This state is a live rock. In particular, a broadcast request in which all load store units are designated as destinations easily causes the live lock. When the live lock occurs, a specific memory access request is not processed, and the processing on the memory access request is stagnated, which may result in a decrease in the overall processing performance of the arithmetic processing apparatus.

In this regard, even when the related art of selecting a command to be issued using the information indicating the selectable command range is used, commands other than the command that needs to be issued within the performance guarantee period are postponed one after another, which may result in the occurrence of the live rock. Further, even in the related art of preferentially processing the memory access request set with the issuable flag, there is a possibility that requests not set with an issuable flag are postponed one after another, which may result in the occurrence of the live rock.

Hereinafter, embodiments of an arithmetic processing apparatus, an information processing apparatus, and a control method of the arithmetic processing apparatus according to the present disclosure will be described in detail below with reference to the accompanying drawings. It is to be noted that the arithmetic processing apparatus, the information processing apparatus, and the control method of the arithmetic processing apparatus according to the present disclosure are not limited by the following embodiments.

EMBODIMENTS

FIG. 1 is a view illustrating an example of a hardware configuration of an information processing apparatus according to an embodiment. As illustrated in FIG. 1, an information processing apparatus 1 according to the present embodiment includes a CPU (Central Processing Unit) 11, a memory 12, an IO controller 13, a hard disk 14, and a PCI (Peripheral Component Interconnect) device 15.

The CPU 11 serving as an arithmetic processing apparatus is coupled to the memory 12 and the IO controller 13 by a bus. The CPU 11 reads various programs stored in the hard disk 14 via the IO controller 13, and deploys and executes the programs on the memory 12, so as to operate an OS (Operating System) and various applications.

Further, the CPU 11 causes the PCI device 15, which is an accelerator, to perform a specific process in the execution of an application. For example, the CPU 11 causes the PCI device 15 to perform some arithmetic processing when an application is executed. Specifically, software executed by the CPU 11 transmits an operation instruction to the PCI device 15, together with data to be used for the operation, via the IO controller 13.

The IO controller 13 is coupled to the hard disk 14 and the PCI device 15. In response to an instruction from the CPU 11, the IO controller 13 controls the hard disk 14 and the PCI device 15. Then, the IO controller 13 relays a communication of the CPU 11 with the hard disk 14 and the PCI device 15. Although the hard disk 14 and the PCI device 15 are here described as an example of IO devices, other IO devices may be coupled to the IO controller 13.

The hard disk 14 stores various programs such as an OS and various applications. The PCI device 15 is an accelerator. The PCI device 15 executes, for example, a designated arithmetic processing in response to a request for an execution of an arithmetic processing from the CPU 11. The PCI device 15 includes a multicore arithmetic processor 100.

Figure 2:
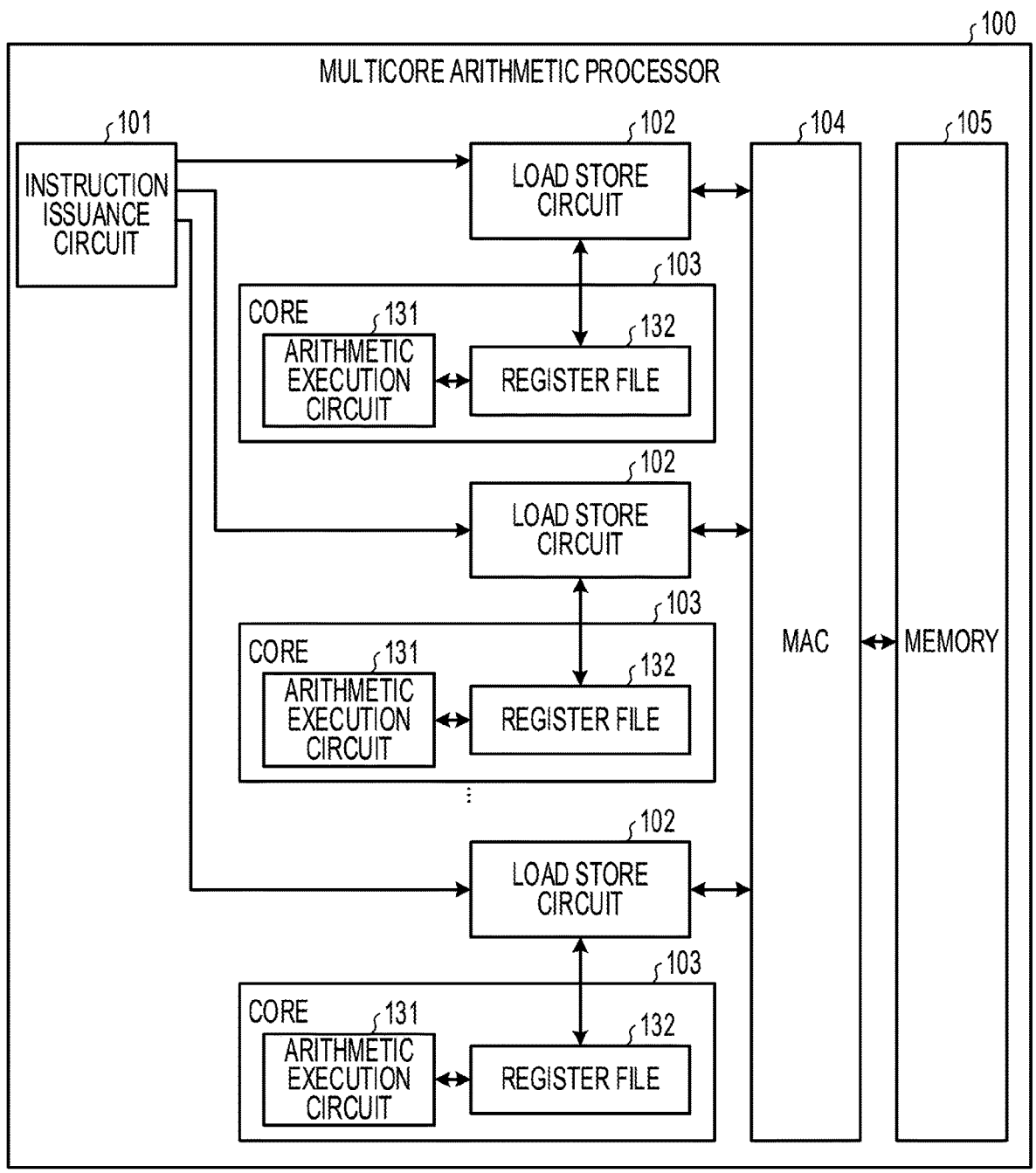
FIG. 2 is a block diagram of a multicore arithmetic processor.

FIG. 2 is a block diagram of the multicore arithmetic processor. As illustrated in FIG. 2, the multicore arithmetic processor 100 includes an instruction issuance circuit 101, a plurality of load store circuits 102, a plurality of cores 103, a MAC (Memory Access Controller) 104, and a memory 105. The multicore arithmetic processor 100 corresponds to an example of an "information processing apparatus."

Each core 103 includes an arithmetic execution circuit 131 and a register file 132. Further, in the present embodiment, the cores 103 have the relationship of a one-to-one correspondence with the load store circuits 102. The register file 132 receives and stores memory read data which is read from the memory 105, from the corresponding load store circuit 102. The arithmetic execution circuit 131 uses the memory read data stored in the register file 132 to execute an arithmetic operation. This core 103 corresponds to an example of an "arithmetic processing circuit."

The MAC 104 acquires and processes a request of a memory access instruction stored in the load store circuit 102. For example, when the request of the memory access instruction is a load request for reading data, the MAC 104 reads the memory read data from the address of the memory 105 designated by the load request. Then, the MAC 104 uses the read memory read data to generate a memory read completion. Thereafter, the MAC 104 transmits the memory read completion to the load store circuit 102. This MAC 104 corresponds to an example of a "control circuit."

The memory 105 is a storage device. Under the control of the MAC 104, the memory 105 reads data from a designated address and writes data to a designated address. This memory 105 corresponds to an example of a "storage device."

The load store circuits 102 are arranged corresponding to the plurality of cores 103, respectively. The load store circuits 102 are coupled to their corresponding cores 103, respectively. The load store circuits 102 are also coupled to the MAC 104. Each load store circuit 102 corresponds to an example of an "access circuit."

Each load store circuit 102 receives an input of the request of the memory access instruction from the instruction issuance circuit 101. Here, in the present embodiment, description will be made on a case where the load store circuit 102 can store one request. The load store circuit 102 stores the request until the memory access of the request is completed. The request of the memory access instruction corresponds to an example of a "transaction."

The load store circuit 102 accesses the memory 105 via the MAC 104 according to the acquired memory access instruction. More specifically, when the memory access instruction is a load instruction, the load store circuit 102 reads data designated by the load instruction from the memory 105, and outputs the read data to the register file 132. In addition, when the memory access instruction is a store instruction, the load store circuit 102 stores data designated by the store instruction in the memory 105. Then, when the memory access of the request is completed, the load store circuit 102 erases the request.

In this case, since the load store circuit 102 can store one request, the load store circuit 102 becomes a busy state and does not receive a new request when the load store circuit 102 is performing the memory access. When the memory access is completed, the load store circuit 102 outputs a signal indicating the release of the busy state to the instruction issuance circuit 101. This load store circuit 102 corresponds to an example of an "access circuit."

However, in a case where the load store circuit 102 can store a plurality of requests, the load store circuit 102 becomes a busy state and refuses to receive a request when the load store circuit 102 becomes a state of storing the upper limit number of storable requests. More specifically, the load store circuit 102 has a queue for storing requests. Then, the number of requests that the load store circuit 102 can store is determined by the number of entries provided in the queue. That is, when the requests are not stored in all of the entries of the queue owned by the load store circuit 102, in other words, when any one of the entries of the queue does not store a request, the load store circuit 102 is in a request receivable state rather than the busy state.

The instruction issuance circuit 101 acquires a memory access instruction issued from, for example, software executed by the CPU 11. Then, the instruction issuance circuit 101 accumulates the acquired memory access instruction as a request. Thereafter, the instruction issuance circuit 101 checks the state of the load store circuit 102 of the destination of each request. Then, the instruction issuance circuit 101 selects a request to be issued, based on the load store circuit 102 of the destination of each request and the state thereof. Thereafter, the instruction issuance circuit 101 outputs the selected request to the destination load store circuit 102. The instruction issuance circuit 101 corresponds to an example of an "instruction issuance circuit."

Figure 3:
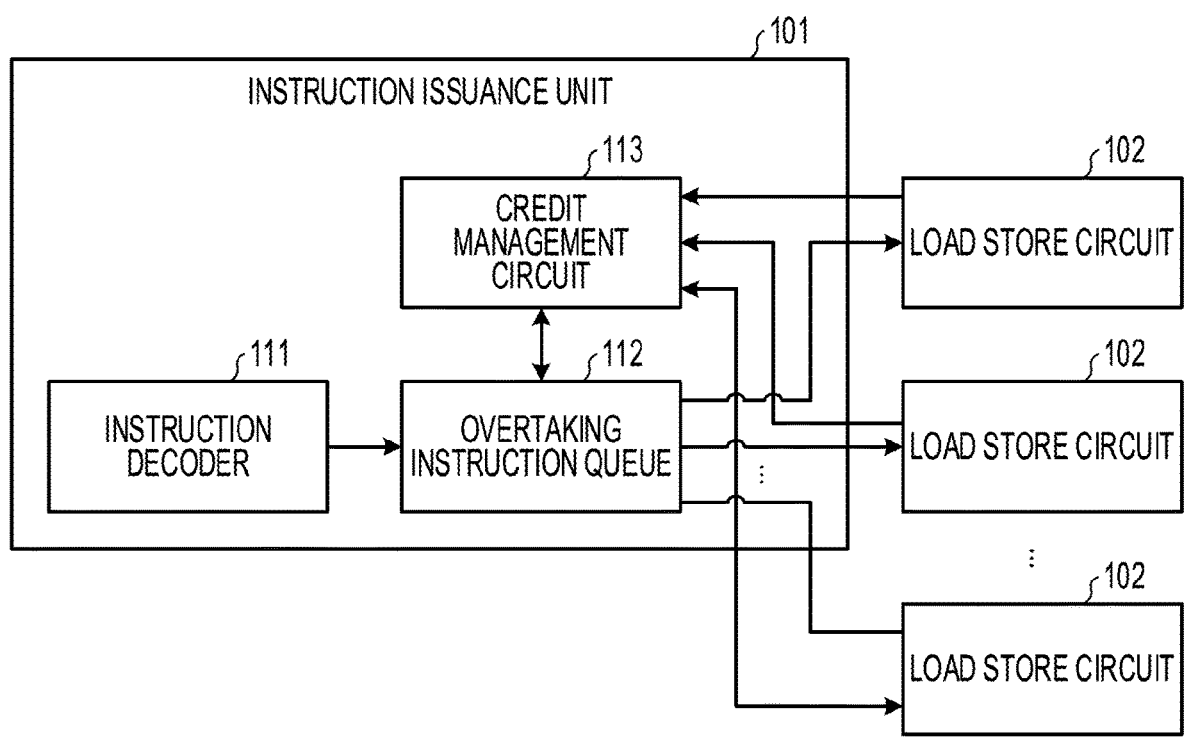
FIG. 3 is a block diagram of an instruction issuance circuit.

Next, details of the instruction issuance circuit 101 will be described with reference to FIG. 3. FIG. 3 is a block diagram of the instruction issuance circuit. As illustrated in FIG. 3, the instruction issuance circuit 101 includes an instruction decoder 111, an overtaking instruction queue 112, and a credit management circuit 113.

The instruction decoder 111 decodes a received memory access instruction and generates a memory access request. Then, the instruction decoder 111 outputs the request to the overtaking instruction queue 112.

The credit management circuit 113 has a register for storing a credit indicating the number of requests that can be received by each load store circuit 102, for each load store circuit 102. Then, the credit management circuit 113 initializes each register at a stage where no request is issued to any load store circuit 102. In the present embodiment, since each load store circuit 102 can store one request, the credit management circuit 113 sets the credit of each load store circuit 102 to 1. The load store circuit 102 with the credit of 1 is not in the busy state but in the request receivable state.

Thereafter, the credit management circuit 113 receives information of the destination of an issued request from the overtaking instruction queue 112. Then, the credit management circuit 113 decrements the credit of the load store circuit 102 of the destination of the issued request by 1. In the present embodiment, the credit management circuit 113 sets the credit of the load store circuit 102 of the destination of the issued request to 0. The load store circuit 102 with the credit of 0 is in the busy state which is the state of refusing to receive a request.

In addition, when the signal indicating the release of the busy state is received from the load store circuit 102, the credit management circuit 113 increments the credit by 1. The signal indicating the release of the busy state which is transmitted from the load store circuit 102 will be referred to as a credit release signal. Here, the credit release signal is a signal having a High level for one cycle when the load store circuit 102 completes the access.

Then, the credit management circuit 113 outputs a signal indicating the busy state of the load store circuit 102 to the overtaking instruction queue 112. Specifically, the credit management circuit 113 outputs a busy signal indicating a High value for the load store circuit 102 with the register value of 0. In addition, the credit management circuit 113 outputs a busy signal indicating a Low value for the load store circuit 102 with the register value of 1. As a result, the credit management circuit 113 notifies the busy state of each load store circuit 102 to the overtaking instruction queue 112.

Here, in the present embodiment, the overtaking instruction queue 112 grasps the busy state of each load store circuit 102 using the credit management circuit 113. However, the overtaking instruction queue 112 may grasp the busy state of each load store circuit 102 by another method. For example, the overtaking instruction queue 112 may receive a multi-bit signal indicating the number of receivable requests from each load store circuit 102 so as to grasp the busy state of each load store circuit 102 based on the multi-bit signal.

Figure 4:
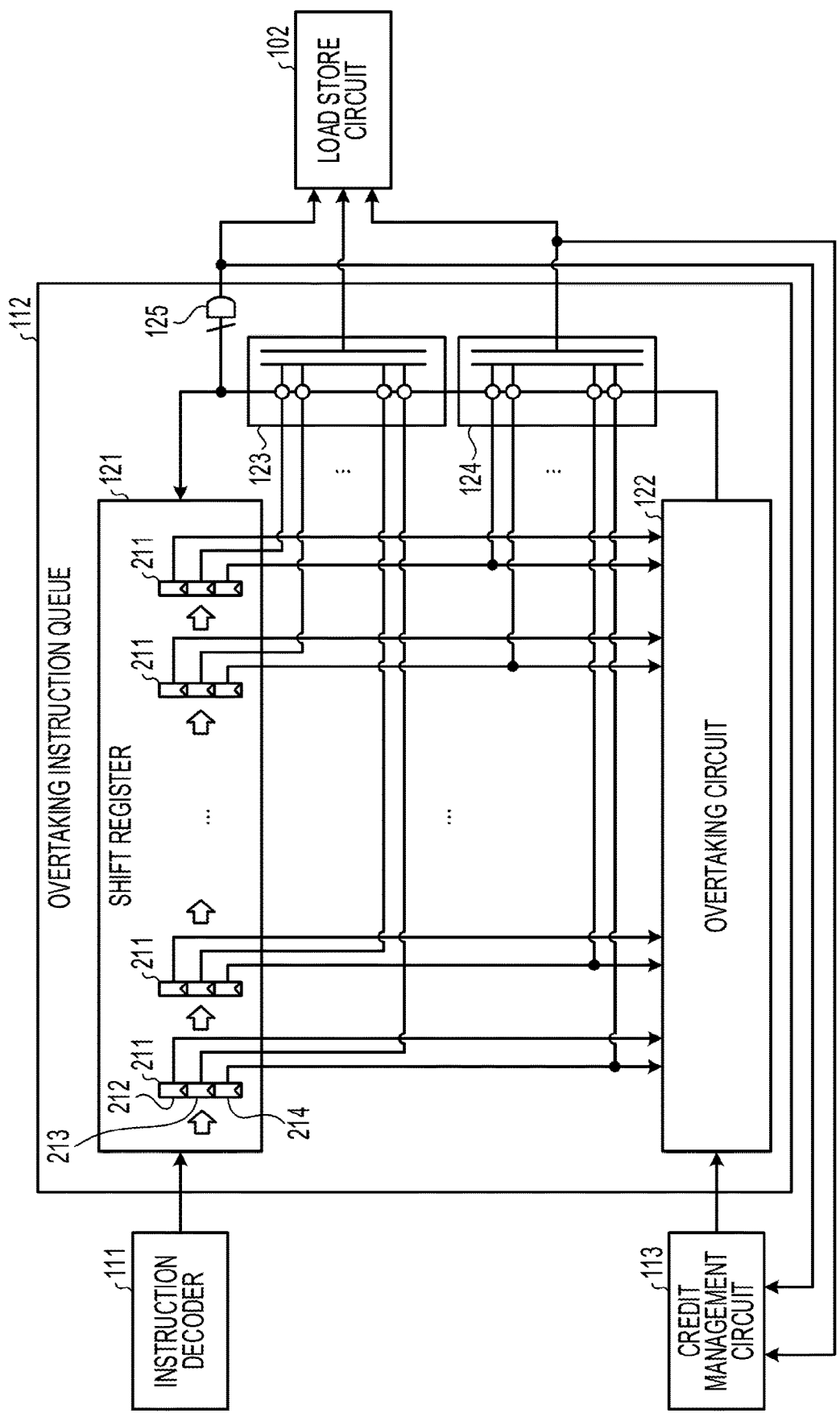
FIG. 4 is a view illustrating details of an overtaking instruction queue.

Next, the overtaking instruction queue 112 will be described with reference to FIG. 4. FIG. 4 is a view illustrating details of the overtaking instruction queue. The overtaking instruction queue 112 includes a shift register 121, an overtaking circuit 122, selectors 123 and 124, and a multistage AND circuit 125. The overtaking instruction queue 112 corresponds to an example of an "arithmetic processing apparatus."

The shift register 121 is a K-stage shift register. That is, the shift register 121 has K registers 211. In the present embodiment, the registers 211 are arranged in order from the register 211 at the right end toward the left side in FIG. 4. In the registers 211, a request output from the instruction decoder 111 is stored in a register 211 immediately behind the last register 211 which has a request. That is, the shift register 121 stores requests in a chronological order from the head register 211.

The shift register 121 erases the request that is selected as an issuance target request by the overtaking circuit 122 (which will be described later), from the registers 211. Then, the shift register 121 updates the storage position of the requests stored in the registers 211 such that the requests are always arranged without vacancy in order of arrival from the head register 211. That is, when a register 211 which no longer store a request due to the issuance of the selected request occurs, the shift register 121 moves the requests stored by the respective registers 211 behind the register 211 from which the request has been erased, to one register 211 on the head side. As a result, the head side of the registers 211 is filled with the requests.

Each register 211 has areas 212 to 214. The area 212 stores a valid signal indicating whether or not a request is stored. The valid signal goes to High when the shift register 121 stores a request, and goes to Low when the shift register 121 stores no request. The area 213 stores request data. The area 214 stores a bitmap of the load store circuit 102 of the request destination, in other words, information of the load store circuit 102 of the request destination. This shift register 121 corresponds to an example of a "storage circuit."

The overtaking circuit 122 receives an input of the valid signal stored in each register 211 and the information of the destination load store circuit 102. Further, the overtaking circuit 122 receives an input of information on the busy state of each load store circuit 102 from the credit management circuit 113. Then, the overtaking circuit 122 determines an issuance target request, based on the valid signal of each register 211, the information of the load store circuit 102 of the request destination stored in each register 211, and the busy state of each load store circuit 102. Then, the overtaking circuit 122 causes the selectors 123 and 124 to select and issue an issuance target request. Further, the overtaking circuit 122 outputs information on the issuance target request to the shift register 121.

Figure 5:
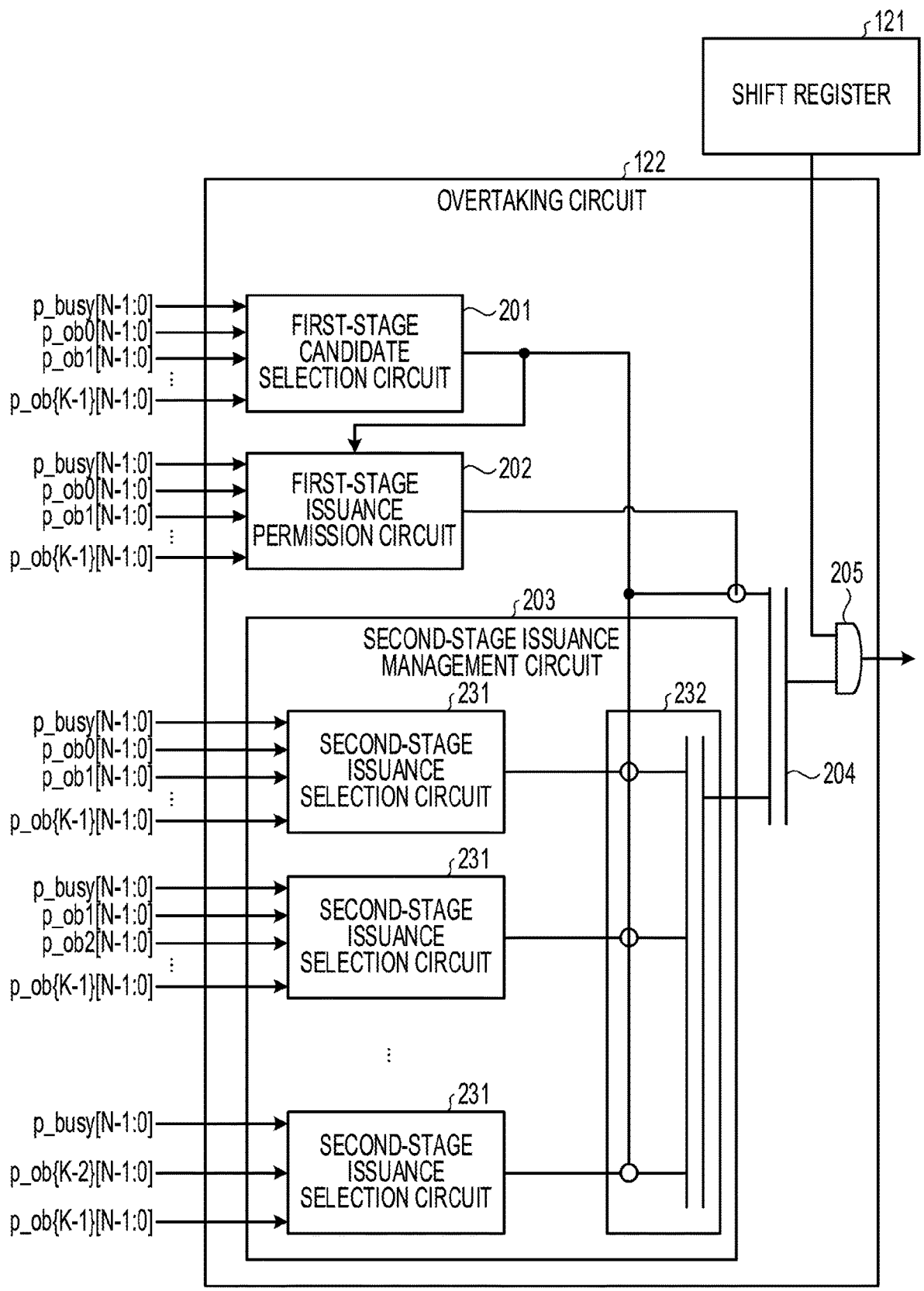
FIG. 5 is a block diagram of an overtaking circuit.

Next, the overtaking circuit 122 will be described with reference to FIG. 5. FIG. 5 is a block diagram of the overtaking circuit. Here, descriptions will be made on a case where N load store circuits 102 exist. The overtaking circuit 122 includes a first-stage candidate selection circuit 201, a first-stage issuance permission circuit 202, a second-stage issuance management circuit 203, a selector 204, and an AND circuit 205.

In FIG. 5, a signal denoted by p_busy[N−1:0] is a busy signal indicating the busy state of the N load store circuits 102 represented by a bitmap. Signals denoted by p_ob0[N−1:0], p_ob1[N−1:0], . . . , p_ob{K−1}[N−1:0] are signals representing the load store circuits 102 of the destination of the requests stored in the respective registers 211 in a bit map format. Here, ob0 to ob{K−1} are codes allocated to the K registers 211 arranged in order from the head, with ob0 allocated to the head register 211. For example, p_ob{i}[N−1:0] represents a signal indicating a load store circuit 102 of the destination of a request stored in the (i+1)-th register 211 from the head.

The first-stage candidate selection circuit 201 stores in advance a first-stage candidate selection condition that any one of the destination load store circuits 102 is not in the busy state. Then, the first-stage candidate selection circuit 201 receives an input of the signals p_busy[N−1:0] and p_ob0[N−1:0] to p_ob{K−1}[N−1:0].

The first-stage candidate selection circuit 201 selects the headmost request among the requests satisfying the first-stage candidate selection condition that any one of the destination load store circuits 102 is not in the busy state, as a first-stage candidate. That is, the first-stage candidate selection circuit 201 selects a request of which an acquisition sequence number is the smallest among the requests satisfying the first-step candidate selection condition, as the first-stage candidate. Then, the first-stage candidate selection circuit 201 outputs a bitmap signal for selecting the first-stage candidate. Here, when there is no request satisfying the first-stage candidate selection condition, the first-stage candidate selection circuit 201 outputs a signal not selecting any request, that is, a signal of bitmap in which all N bits are 0. This first-stage candidate selection circuit 201 corresponds to an example of a "first selection circuit." The request of the first-stage candidate corresponds to an example of a "first transaction."

The first-stage issuance permission circuit 202 has a first-stage issuance permission condition that none of the destination load store circuits 102 is in the busy state. That is, the first-stage issuance permission condition is a condition for determining whether or not the first-stage candidate is issuable. Then, the first-stage issuance permission circuit 202 receives an input of the signals p_busy[N−1:0] and p_ob0[N−1:0] to p_ob{K−1}[N−1:0]. In addition, the first-stage issuance permission circuit 202 receives an input of the bitmap signal designating the first-stage candidate from the first-stage candidate selection circuit 201. Further, the first-stage issuance permission circuit 202 acquires the request destination of the first-stage candidate designated by the received bitmap signal from the signals p_ob 0[N−1:0] to p_ob{K−1}[N−1:0]. Then, the first-stage issuance permission circuit 202 uses the signal p_busy[N−1:0] to determine whether or not the request destinations of the first-stage candidate are all in the busy state.

When the request of the first-stage candidate satisfies the first-stage issuance permission condition, that is, when none of the request destinations of the first-stage candidate is in the busy state, the first-stage issuance permission circuit 202 outputs a signal for permitting the issuance of the request of the first-stage candidate. In this case, the signal for selecting the first-stage candidate which is output from the first-stage candidate selection circuit 201 and directed toward the selector 204 becomes valid by the signal for permitting the issuance of the request of the first-stage candidate which is output from the first-stage issuance permission circuit 202, and is input to the selector 204.

In the meantime, when the request of the first-stage candidate does not satisfy the first-stage issuance permission condition, that is, when any one of the request destinations of the first-stage candidate is in the busy state, the first-stage issuance permission circuit 202 outputs a signal for invalidating the issuance of the request of the first-stage candidate. In this case, the signal for selecting the first-stage candidate which is output from the first-stage candidate selection circuit 201 and directed toward the selector 204 becomes invalid by the signal output from the first-stage issuance permission circuit 202, and the signal for invalidation is input to the selector 204. The first-stage issuance permission circuit 202 corresponds to an example of a "determination circuit."

The second-stage issuance management circuit 203 has a second-stage issuance selection condition that none of the destination load store circuits 102 of a request behind the first-stage candidate is in the busy state and overlaps with those of the first-stage candidate. The request behind the first-stage candidate is, in other words, a request of which the acquisition sequence number is larger than that of the first-stage candidate. The second-stage issuance management circuit 203 receives an input of the signals p_busy[N−1:0] and p_ob0[N−1:0] to p_ob{K−1}[N−1:0].

The second-stage issuance management circuit 203 uses the signal p_busy[N−1:0] to extract requests behind the first-stage candidate, for which none of the destination load store circuits 102 is in the busy state. Next, the second-stage issuance management circuit 203 specifies the request of the first-stage candidate and the destination load store circuits 102 of the extracted requests from the signals p_ob0[N−1:0] to p_ob{K−1}[N−1:0]. Then, the second-stage issuance management circuit 203 further extracts requests for which the destination load store circuits 102 do not overlap with the request of the first-stage candidate, among the extracted requests. Thereafter, the second-stage issuance management circuit 203 sets the headmost request among the extracted requests as an issuance target request. Then, the second-stage issuance management circuit 203 outputs a bitmap signal for selecting the issuance target request. This second-stage issuance management circuit 203 corresponds to an example of a "second selection circuit." The request set as an issuance target request by the second-stage issuance management circuit 203 corresponds to an example of a "second transaction."

Here, the operation of the second-stage issuance management circuit 203 according to the present embodiment will be described in more detail. In the present embodiment, the second-stage issuance management circuit 203 predicts all the cases where each of the K requests is selected as the first-stage candidate, and executes the second-stage issuance selecting processes that correspond to the respective cases in parallel. Then, after selecting the first-stage candidate, the second-stage issuance management circuit 203 selects the result of the second-stage issuance selection that corresponds to the selected first-stage candidate. The second-stage issuance management circuit 203 has K−1 second-stage issuance selections circuits 231 and a selector 232.

When the drawing is viewed from the front, the uppermost second-stage issuance selection circuit 231 performs the second-stage issuance selection when the head request is the first-stage candidate. In addition, when the drawing is viewed from the front, the second second-stage issuance selection circuit 231 from the top performs the second-stage issuance selection when the second request from the head is the first-stage candidate. In this order, each second-stage issuance selection circuit 231 performs the second-stage issuance selection when a request immediately behind the request selected as the first-stage candidate by the previous second-stage issuance selection circuit 231 is the first-stage candidate. The bottommost second-stage issuance selection circuit 231 executes the second-step issuance selecting process when the second request from the tail is the first-stage candidate.

Here, descriptions will be made on the second-stage issuance selection circuit 231 in a case where the m-th request from the head is the first-stage candidate. The second-stage issuance selection circuit 231 acquires signals indicating the destinations of the requests stored in the registers 211 from the m-th from the head to the end, that is, p_ob{m−1}[N−1:0] to p_ob{k−1}[N−1:0]. Hereinafter, the requests stored in the registers 211 from the m-th from the head to the end will be referred to as (m−1)-th to (k−1)-th requests, respectively. Further, the second-stage issuance selection circuit 231 acquires a signal p_busy[N−1:0] indicating the busy state of each load store circuit 102.

The second-stage issuance selection circuit 231 selects requests for which none of the destination load store units 102 is in the busy state, among the (m−2)-th to (k−1)-th requests, based on the signals p_ob{m−2}[N−1:0] to p_ob{k−1}[N−1:0] and p_busy[N−1:0]. Next, the second-stage issuance selection circuit 231 extracts requests for which the destination load store circuits 102 do not overlap with those of the (m−1)-the request, among the requests selected using p_ob{m−1}[N−1:0]. Then, the second-stage issuance selection circuit 231 sets a request closest to the head among the extracted requests as an issuance target request. Thereafter, the second-stage issuance selection circuit 231 outputs a bitmap signal representing the issuance target request.

The outputs of the respective second-stage issuance selection circuits 231 are input to the selector 232 in a state where a signal in a case where the first-stage candidate determined by the first-stage candidate selection circuit 201 is used becomes valid and the other signals become invalid by the signal indicating the first-stage candidate which is output from the first-stage candidate selection circuit 201.

The selector 232 outputs the valid signal of the signals output from the respective second-stage issuance selection circuits 231, to the selector 204. That is, the selector 232 outputs the head request that is present behind the first-stage candidate determined by the first-stage candidate selection circuit 201 and satisfies the second-stage issuance selection condition, to the selector 204.

The selector 204 receives an input of the signal that selects the request of the first-stage candidate output from the first-stage candidate selection circuit 201 and is set with valid/invalid by the first-stage issuance permission circuit 202. Further, the selector 204 receives an input of the signal that selects the head request which is present behind the first-stage candidate and satisfies the second-stage issuance selection condition, from the second-stage issuance management circuit 203.

When the signal output from the first-stage candidate selection circuit 201 is valid, the selector 204 outputs a signal for selecting the request that has become the issuance target request by the first-stage candidate selection circuit 201, that is, the request of the first-stage candidate, to the AND circuit 205. Meanwhile, when the signal output from the first-stage candidate selection circuit 201 is invalid, the selector 204 outputs a signal for selecting the request that has become the issuance target request by the second-stage issuance management circuit 203, to the AND circuit 205. That is, the selector 204 outputs a signal for selecting the head request that satisfies the second-stage issuance selection condition, to the AND circuit 205. This selector 204 corresponds to an example of an "issuance circuit."

The AND circuit 205 receives an input of the signal represented by a bitmap for selecting the issuance target request, from the selector 204. Further, the AND circuit 205 receives an input of the valid signal representing the valid register 211 with a bitmap, from the shift register 121. Then, the AND circuit 205 calculates the logical conjunction of the two input signals and outputs a result of the calculation. That is, when the register 211 that stores the issuance target request is valid, the AND circuit 205 outputs a signal for selecting the issuance target request.

For example, a case where requests having destinations illustrated in FIG. 6 are stored in the shift register 121 will be described. FIG. 6 is a view for explaining an issuance target request to be selected. A table 301 in FIG. 6 is a table representing destinations of the requests stored in the respective registers 211. A destination LSU bitmap represents the bitmap of the load store circuits 102 of the destination of each request. Here, description will be made with the assumption that requests #0 to #15 exist. A table 302 represents the busy state of each load store circuit 102. Here, [0] to [N−1] represent numbers when numbers 0 to N−1 are assigned to N load store circuits 102, respectively.

In this case, the [N−1]-th load store circuit 102 among the destination load store circuits 102 is busy, as indicated by the busy signal in the table 302. Since the request #0 has the [N−1]-th load store circuit 102 as a destination and has no other destinations, the first-stage candidate selection circuit 201 does not select the request #0 as the first-stage candidate. Next, since the destinations of the request #1 are the [N−1]-th and [N−2]-th load store circuits 102, the first-stage candidate selection circuit 201 determines that at least one of the destination load store circuits 102 of the request #1 is not in the busy state. Therefore, the first-stage candidate selection circuit 201 sets the request #1 as the first-stage candidate.

The first-stage issuance permission circuit 202 does not permit the issuance of the request #1 which has been set as the first-stage candidate by the first-stage candidate circuit 201 since the destinations of the request #1 include the [N−1]-th load store circuit 102.

Therefore, the second-stage issuance management circuit 203 selects the headmost request from requests for which none of the destination load store circuits 102 is in the busy state and overlaps with those of the request #1, among the requests #2 to #15 behind the request #1. Here, for example, it is assumed that all of the destination load store circuits 102 of the requests #2 to #K−3 overlap with those of the request #1. In this case, the destination load store circuit 102 of the request #14 is the [N−3]-th load store circuit 102, and does not include the [N−1]-th load store circuit 102. Therefore, the second-stage issuance management circuit 203 selects the request #14 as an issuance target request.

In this case, since the issuance of the request #1 as the first-stage candidate is invalidated, the selector 204 selects the request #14 as the issuance target request. Then, when the (K−2)-th register 211 that stores the request #14 is valid, the AND circuit 205 outputs a signal for selecting the request #14.

Figure 7:
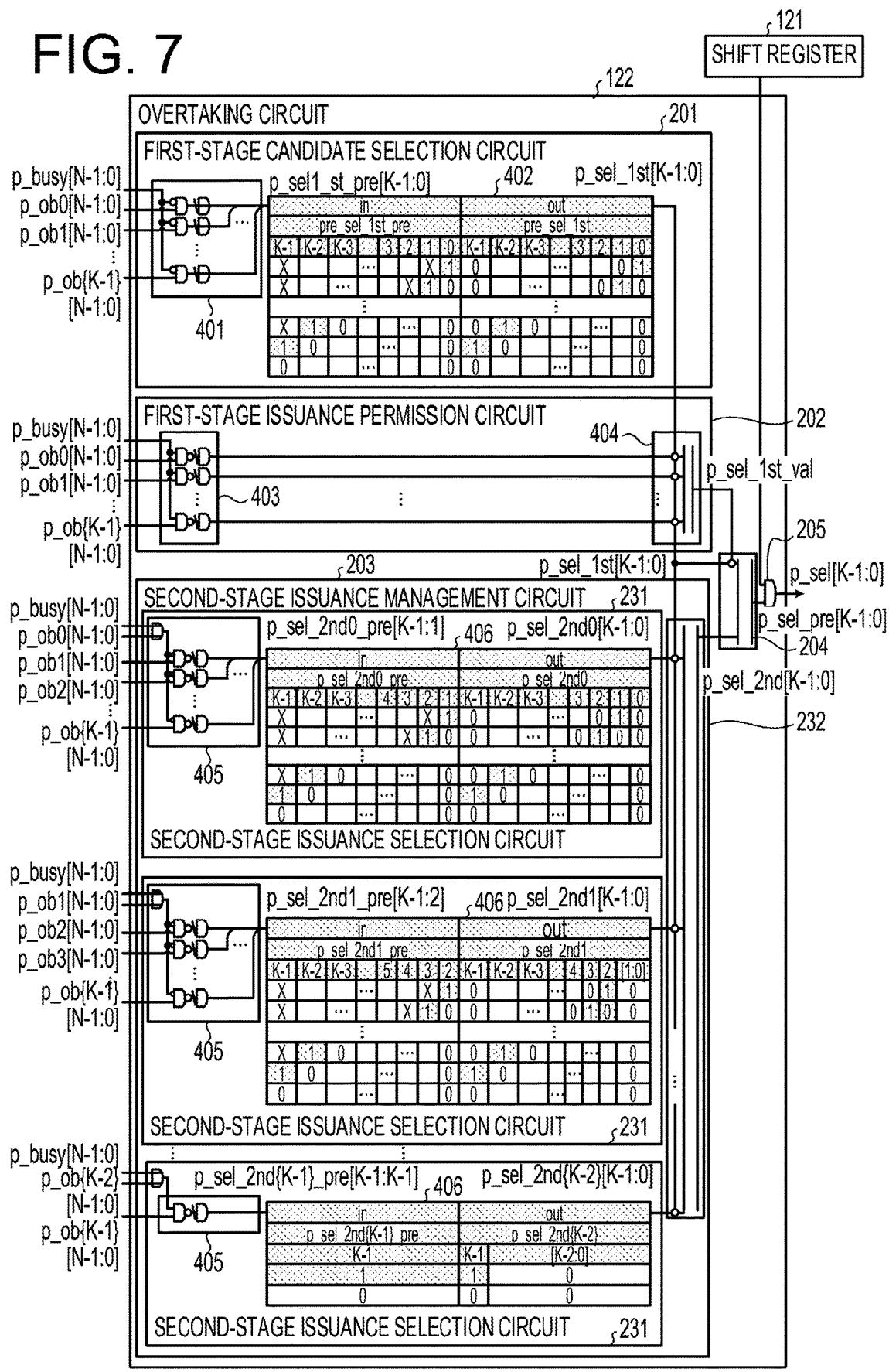
FIG. 7 is a circuit diagram of an overtaking circuit.

Here, the operation of the overtaking circuit 122 will be described in more detail with reference to FIG. 7. FIG. 7 is a circuit diagram of the overtaking circuit. Here, each of the K registers 211 will be referred to as a register ob{i} (i=0 to K−1).

When the request stored in the register ob{i} which is the i-th register 211 satisfies the first-stage candidate selection condition, a logic circuit 401 of the first-stage candidate selection circuit 201 sets the i-th bit of p_sel_1st_pre[K−1:0] to High. The p_sel_1st_pre[K−1:0] is a K-bit signal indicating whether or not each request satisfies the first-stage candidate selection condition.

When there is no register ob{i} that satisfies the first-stage candidate selection condition, the logic circuit 401 outputs the signal p_sel_1st_pre[K−1:0] in which all bits are Low. Therefore, the first-stage candidate selection circuit 201 outputs all the bits of p_sel_1st_pre[K−1:0] which is the signal for selecting the first-stage candidate according to a truth table 402, as Low. In this case, the signal p_sel_1 st_val which is the output signal from the first-stage issuance permission circuit 202 is also Low. In addition, since all the bits in all of p_sel2nd{i}[K−1:0] which is the output signal of the second-stage issuance selection circuit 231 are Low, all the bits of p_sel_2 nd[K−1:0] which is the output signal from the selector 232 are also Low. Therefore, all the bits of p_sel_pre[K−10] which is the output signal from the selector 204 are also Low.

In the meantime, when the register ob{i} which is the i-th register 211 satisfies the first-stage candidate selection condition and is the register 211 closest to the head, the i-th bit of p_sel_1st[K−1:0] becomes High and reads all other bits become Low, according to the truth table 402.

The first-stage issuance permission circuit 202 determines whether or not each request stored in the registers ob0 to ob{K−1} satisfies the first-stage issuance permission condition by the logic circuit 403. The logic circuit 403 outputs a K-bit signal using K output paths. The logic circuit 403 sets the i-th bit to High when none of the destinations of the request stored in the register ob{i} is in the busy state.

A selector 404 receives an input of the output signal from the logic circuit 403, selects a determination result according to p_sel_1st[K−1:0], and outputs the determination result as p_sel_1st_val. Therefore, the first-stage issuance permission circuit 202 sets p_sel_1st_val to High when the first-stage candidate satisfies the first-stage issuance permission condition, and sets p_sel_1st_val to Low when the first-stage candidate does not satisfy the first-stage issuance permission condition.

When p_sel_1st_val is High, the selector 204 outputs p_sel_1st[K−1:0] as p_sel_pre[K−1:0].

Meanwhile, when p_sel_1st_val is Low, the process proceeds to the second-stage issuance selection which is the selection of the issuance target request by the second-stage issuance management circuit 203. The second-stage issuance management circuit 203 has the (K−1) second-stage issuance selection circuits 231 and the selector 232. The second-stage issuance selection circuits 231 represent a selection logic circuit in a case where the request stored in the register ob0 is the first-stage candidate, and a selection logic circuit in a case where the request stored in the register ob1 is the first-stage candidate, from the top. In this order, in the second-stage issuance selection circuits 231, selection logic circuits are arranged up to a selection logic circuit in a case where the request stored in the register ob{k−2} is the first-stage candidate.

While the second-stage issuance selection circuits 231 are different from each other in the configuration of the logic circuit 405 and the contents of the held truth table 406, the second-stage issuance selection circuits 231 have the same function. Therefore, the second-stage issuance selection circuit 231 which is the selection logic circuit in the case where the request of the register ob0 is the first-stage candidate will be described as an example.

The logic circuit 405 calculates the logical disjunction of a busy signal p_busy[N−1:0] which is a bitmap representing the busy state of each load store circuit 102 and a signal p_ob0[N−1:0] which is a bitmap representing the destination of the request stored in the register ob0. Next, the logic circuit 405 calculates the logical conjunction of the calculated logical disjunction and each of the destinations of the requests stored in the other registers ob1 to ob{K−1}. Then, the logic circuit 405 inverts the calculated logical conjunction to obtain the logical conjunction of all the bits. Then, the logic circuit 405 outputs a High value when the destination of each request stored in each of the registers ob1 to ob{K−1} does not overlap with the destination of the request stored in the register ob0. Further, the logic circuit 405 outputs a Low value when the destination of each request stored in each of the registers ob1 to ob{K−1} overlaps with the destination of the request stored in the register ob0. As a result, the logic circuit 405 outputs a signal p_sel_2nd0_pre[K−1:0] which is a bitmap representing the logical conjunction obtained for each of the registers ob1 to ob{K−1}. The p_sel_2nd0_pre[K−1:0] is a bitmap signal that satisfies the second-stage issuance selection condition when the request stored by the register ob0 is the first-stage candidate. The logic circuit 405 and the truth table 406 are coupled to each other by a signal line of K−1 bit width.

The truth table 406 is a table for selecting the headmost request having a High value among the signals p_sel_2nd0_pre[K−1:0] output from the logic circuit 405. The second-stage issuance selection circuit 231 uses the truth table 406 to output a signal p_sel_2nd0[K−1:0] representing the headmost request that is included in each of the registers ob1 to ob{K−1} and satisfies the second-stage issuance selection condition. Here, when there is no request satisfying the condition, the second-stage issuance selection circuit 231 outputs the signal p_sel_2nd0[K−1:0] with all the bits of Low according to the truth table 406.

The selector 232 selects the signals p_sel_2nd0[K−1:0] to p_sel_2nd{K−2}[K−1:0] output from the second-stage issuance selection circuit 231 according to p_sel_1st[K−1:0], and outputs a signal p_sel_2nd[K−1:0]. The signal "p_sel_2nd[K−1:0]" is a signal representing the headmost request that is stored in the register 211 behind the first candidate determined by the first-stage candidate selection circuit 201 and satisfies the second-stage issuance selection condition.

When the first-stage issuance permission circuit 202 outputs a signal p_sel_1st_val indicating a validity, the selector 204 outputs the signal p_sel_1st[K−1:0] issued by the first-stage candidate selection circuit 201 as a signal p_sel_pre[K−1:0]. In addition, when the first-stage issuance permission circuit 202 outputs a signal p_sel_1st_val indicating an invalidity, the selector 204 outputs the signal p_sel_2nd[K−1:0] issued by the second-stage issuance management circuit 203 as a signal p_sel_pre[K−1:0].

The AND circuit 205 receives an input of a valid signal which is a bitmap indicating validity/invalidity of each of the registers ob0 to ob{K−1}. Then, the AND circuit 205 calculates the logical conjunction of the signal p_sel_pre[K−1:0] output from the selector 204 and the valid signal, and outputs the signal p_sel_pre[K−1:0] as a signal p_sel[K−1:0]. That is, when the register 211 that stores the request indicated by p_sel_pre[K−1:0] is valid, the AND circuit 205 outputs the signal p_sel_pre[K−1:0] as a signal p_sel[K−1:0].

Referring back to FIG. 4, the description of the operation of the overtaking instruction queue 112 will be continued. The multistage AND circuit 125 receives an input of the signal for selecting the issuance target request which has been output from the overtaking circuit 122. Then, the multistage AND circuit 125 calculates the logical conjunction of all the bits of the input signal. Thereafter, the multistage AND circuit 125 outputs the calculated logical conjunction. Here, when any one request is selected by the signal for selecting the issuance target request which has been output from the overtaking circuit 122, the multistage AND circuit 125 outputs a High signal indicating a validity. When none of the requests is selected by the signal for selecting the issuance target request which has been output from the overtaking circuit 122, the multistage AND circuit 125 outputs a Low signal indicating an invalidity.

The selector 124 receives an input of the information of the load store circuits 102 of the destinations of each request which has been output from each register 211 of the shift register 121. Further, the selector 124 receives an input of the signal for selecting the issuance target request which has been output from the overtaking circuit 122. Then, the selector 124 selects the load store circuit 102 of the destination of the issuance target request according to the signal for selecting the issuance target request.

The selector 123 receives an input of data of each request which has been output from each register 211 of the shift register 121. Further, the selector 123 receives an input of the signal for selecting the issuance target request which has been output from the overtaking circuit 122. Then, the selector 123 selects the data stored in the issuance target request according to the signal for selecting the issuance target request. When the multistage AND circuit 125 outputs a signal indicating a validity, the data selected by the selector 123 is output to the load store circuit 102 of the destination selected by the selector 124. Here, while FIG. 4 represents one load store circuit 102 as an example, the destination may be a plurality of load store circuits 102.

Figure 8:
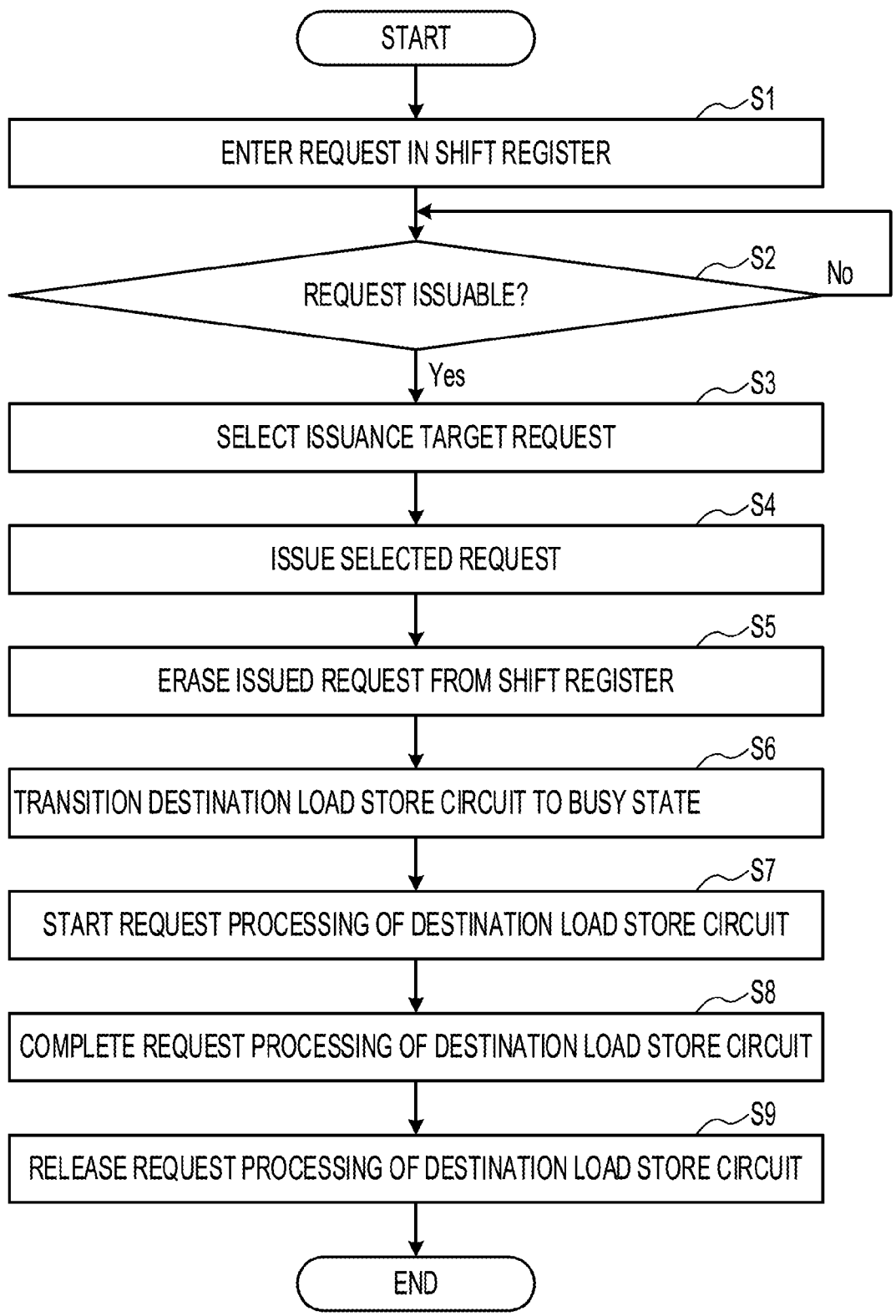
FIG. 8 is a flowchart of an entire request issuing process by an instruction issuance circuit according to an embodiment.

Next, the overall flow of a request issuing process by the instruction issuance circuit 101 according to the embodiment will be described with reference to FIG. 8. FIG. 8 is a flowchart of the entire request issuing process by the instruction issuance circuit according to the embodiment.

The instruction decoder 111 decodes a memory access instruction. Then, the instruction decoder 111 transmits the decoded memory access instruction as a request to the overtaking instruction queue 112, and writes the request in the end of the shift register 121 of the overtaking instruction queue 112 (step S1).

The overtaking instruction queue 112 checks the credit of each load store circuit 102 which is managed by the credit management circuit 113, and acquires the busy state of each load store circuit 102. Then, the overtaking instruction queue 112 checks the destination of the request stored in each register 211 of the shift register 121, and determines whether or not the request is issuable, based on a determination as to whether or not an overtaking is possible (step S2). When it is determined that the request is not issuable ("No" in step S2), the overtaking instruction queue 112 waits until the request becomes issuable.

Meanwhile, when it is determined that the request is issuable ("Yes" in step S2), the overtaking instruction queue 112 selects a request to be issued (step S3). Here, in the flowchart of FIG. 8, steps S2 and S3 are separated from each other to facilitate the understanding of the operation. However, the determination as to whether the request is issuable and the selection of the request to be issued may be performed simultaneously.

The overtaking instruction queue 112 issues the selected request to the load store circuit 102 of the destination of the request (step S4).

Further, the overtaking instruction queue 112 erases the issued request from the shift register 121 (step S5). At this time, when the register 211 behind the register 211 from which the request has been erased stores a request, the overtaking instruction queue 112 fills the request in the head side and again stores the request in the register 211.

The credit management circuit 113 acquires the information on the destination of the request output by the overtaking instruction queue 112. Then, the credit management circuit 113 decrements the credit of the load store circuit 102 of the destination of the request by 1. Here, since the load store circuit 102 can store one request, the information of the load store circuit 102 which is managed by the credit management circuit 113 makes a transition to the busy state (step S6).

Each load store circuit 102 of the destination of the issued request starts to process the request (step S7).

Thereafter, each load store circuit 102 of the destination of the issued request completes the request processing (step S8). Then, each load store circuit 102 outputs the credit release signal to the credit management circuit 113.

The credit management circuit 113 receives an input of the credit release signal from each load store circuit 102 of the destination of the issued request. Then, the credit management circuit 113 decrements the credit of the destination load store circuit 102 by 1. As a result, the information of the load store circuit 102 which is managed by the credit management circuit 113 is released from the busy state (step S9). When the information indicating the busy state of each load store circuit 102 which is managed by the credit management circuit 113 is updated, the determination performed by the overtaking instruction queue 112 in step S2 as to whether or not the request is issuable changes.

Figure 9:
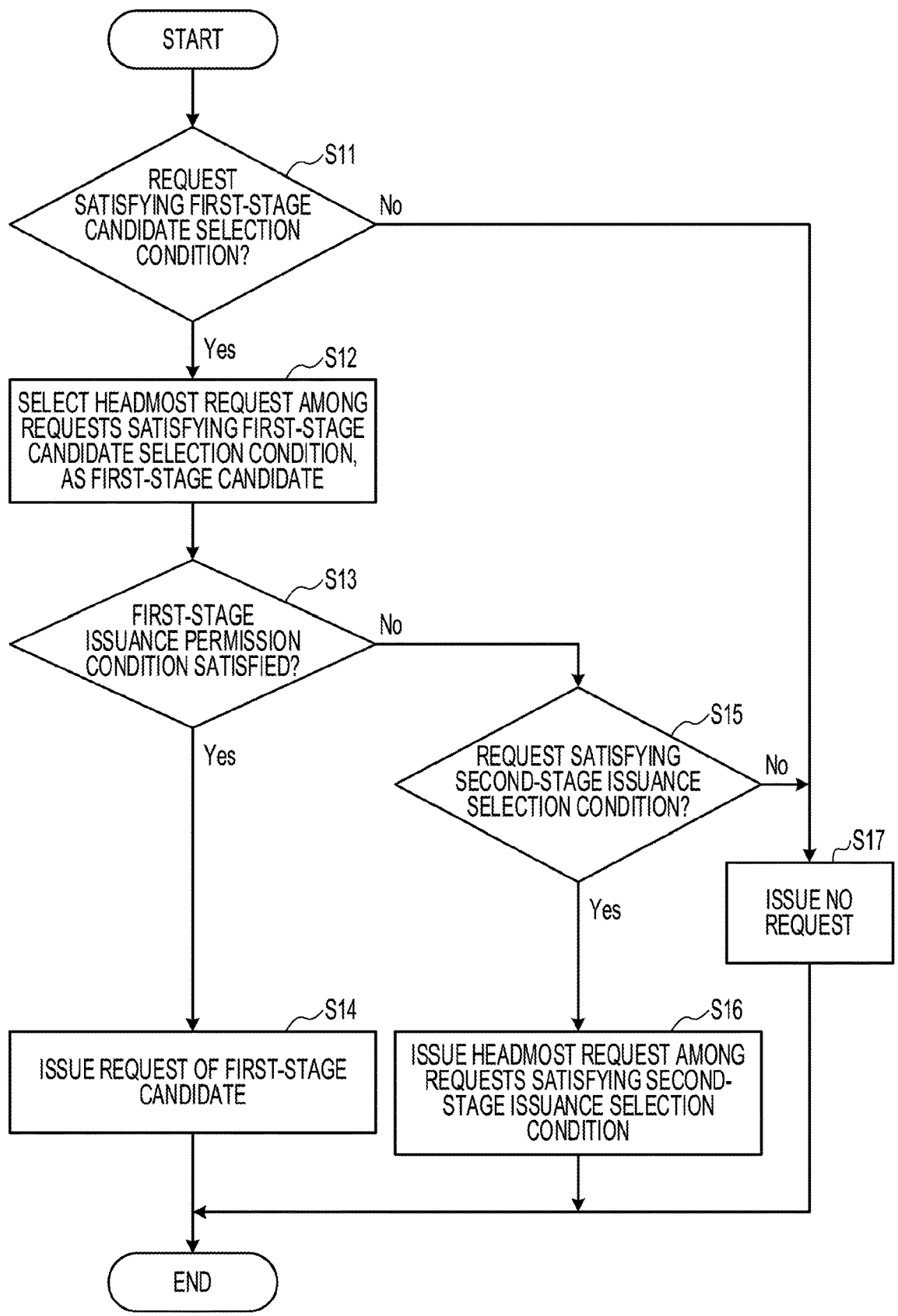
FIG. 9 is a flowchart of a request issuing process by an overtaking instruction queue according to an embodiment.

Next, the flow of the request issuing process by the overtaking instruction queue 112 according to the present embodiment will be described with reference to FIG. 9. FIG. 9 is a flowchart of the request issuing process by the overtaking instruction queue according to the embodiment.

The first-stage candidate selection circuit 201 of the overtaking circuit 122 determines whether or not there exists a request satisfying the first-stage candidate selection condition among the requests stored in the registers 211 of the respective stage of the shift register 121 (step S11).

When it is determined that there exists a request satisfying the first-stage candidate selection condition ("Yes" in step S11), the first-stage candidate selection circuit 201 of the overtaking circuit 122 selects the headmost request among the requests satisfying the first-stage candidate selection condition, as the first-stage candidate (step S12).

Next, the first-stage issuance permission circuit 202 of the overtaking circuit 122 determines whether or not the request of the first-stage candidate selected by the first-stage candidate selection circuit 201 satisfies the first-stage issuance permission condition (step S13).

When it is determined that the request of the first-stage candidate satisfies the first-stage issuance permission condition ("Yes" in step S13), the AND circuit 205 of the overtaking circuit 122 outputs a signal for selecting the request of the first-stage candidate. The selectors 123 and 124 and the multistage AND circuit 125 receive an input of the signal for selecting the request of the first-stage candidate from the overtaking circuit 122 and outputs the request of the first-stage candidate to the destination load store circuit 102 (step S14).

Meanwhile, when it is determined that the request of the first-stage candidate does not satisfy the first-stage issuance permission condition ("No" in step S13), the second-stage issuance management circuit 203 of the overtaking circuit 122 determines whether or not there exists a request satisfying the second-stage issuance selection condition (step S15).

When it is determined that there exists a request satisfying the second-stage issuance selection condition ("Yes" in step S15), the second-stage issuance management circuit 203 of the overtaking circuit 122 selects the headmost request among the requests satisfying the second-stage issuance selection condition, as an issuance target request. The AND circuit 205 of the overtaking circuit 122 outputs a signal for selecting the headmost request among the requests satisfying the second-stage issuance selection condition. The selectors 123 and 124 and the multistage AND circuit 125 receive an input of the signal for selecting the headmost request among the requests satisfying the second-stage issuance selection condition, from the overtaking circuit 122. Then, the selectors 123 and 124 and the multistage AND circuit 125 output the headmost request among the requests satisfying the second-stage issuance selection condition, to the destination load store circuit 102 (step S16).

Meanwhile, when it is determined that there exists no request satisfying the first-stage candidate selection condition ("No" in step S11) and it is determined that there exists no request satisfying the second-stage issuance selection condition ("No" in step S15), the overtaking instruction queue 112 issues no request (step S17).

Figure 10:
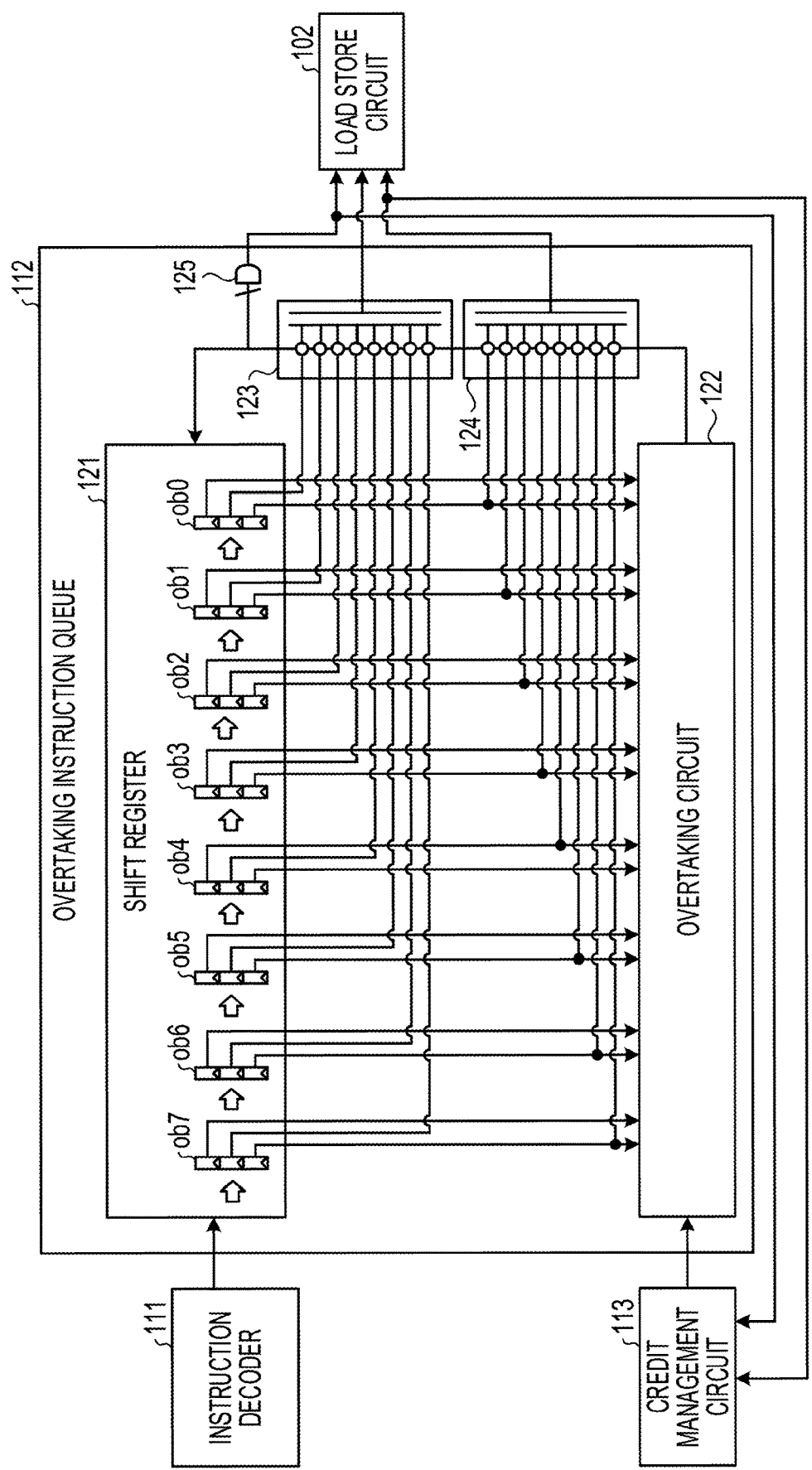
FIG. 10 is a view illustrating a circuit configuration of an overtaking instruction queue having an eight-stage shift register.

Next, a specific example of the request issuing process by the overtaking instruction queue 112 in a case where the shift register 121 has eight stages will be described with reference to FIG. 10. FIG. 10 is a view illustrating details of the overtaking instruction queue having the eight-stage shift register. Here, the eight-stage registers 211 of the shift register 121 will be described as registers ob0 to ob7, respectively. In addition, a case where there are four load store circuits ##0 to ##3 as the load store circuits 102 and there are four cores ###0 to ###3 as the corresponding cores 103.

Figure 11:
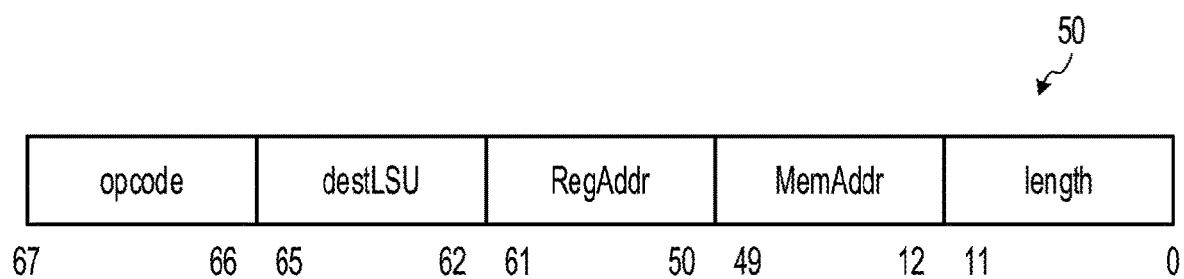
FIG. 11 is a view illustrating an example of a format of a request.

A request of a memory access instruction having a format 50 illustrated in FIG. 11 is input to the shift register 121. FIG. 11 is a view illustrating an example of a format of a request. The opecode[1:0] denotes an area that specifies the types of instructions. The opecode[1:0] represents, for example, the following two types of instructions. The opecode[1:0]=2'b00 represents a load request for transferring data from the memory 105 to the register file 132 inside the core 103. The opecode[1:0]=2'b01 represents a store request for transferring data from the register file 132 inside the core 103 to the memory 105.

The destLSU[3:0] denotes an area that designates the destination load store circuit 102 in a bitmap format. For example, the destLSU[3:0] designates the destination load store circuit 102 as follows. The destLSU[3:0]=4'b0101 designates the load store circuits ##0 and ##2 as the destination load store circuits 102. The destLSU[3:0]=4'b1110 designates the load store circuits ##1, ##2 and ##3 as the destination load store circuits 102. For example, when the load store circuit ##0 is designated as a destination, a data transfer is performed between the register file 132 of the core 103 corresponding to the load store circuit ##0 and the memory 105.

A register to be transferred is designated by a combination of values of areas of RegAddr[11:0] and length[11:0]. The RegAddr[11:0] represents a start register address. A value obtained by adding the value of length[11:0] to the value of RegAddr[11:0] represents an end register address. Registers included in the register file 132 from the start register address to the end register address are registers to be transferred.

A memory address of the memory 105 to be transferred is designated by a combination of values of areas of MemAddr[37:0] and length[11:0]. The memory address to be transferred varies depending on the load store circuits ##0 to ##3, and the memory address to be transferred for the load store circuits ##0 to ##3 is, for example, from the next start memory address to the end memory address. The start memory address is a value obtained by adding a value obtained by multiplying each number of load store circuits ##0 to ##3 by length[11:0] to MemAddr[37:0]. The end memory address is a value obtained by subtracting 1 from a value obtained by adding length[11:0] to the start memory address.

Figure 12:
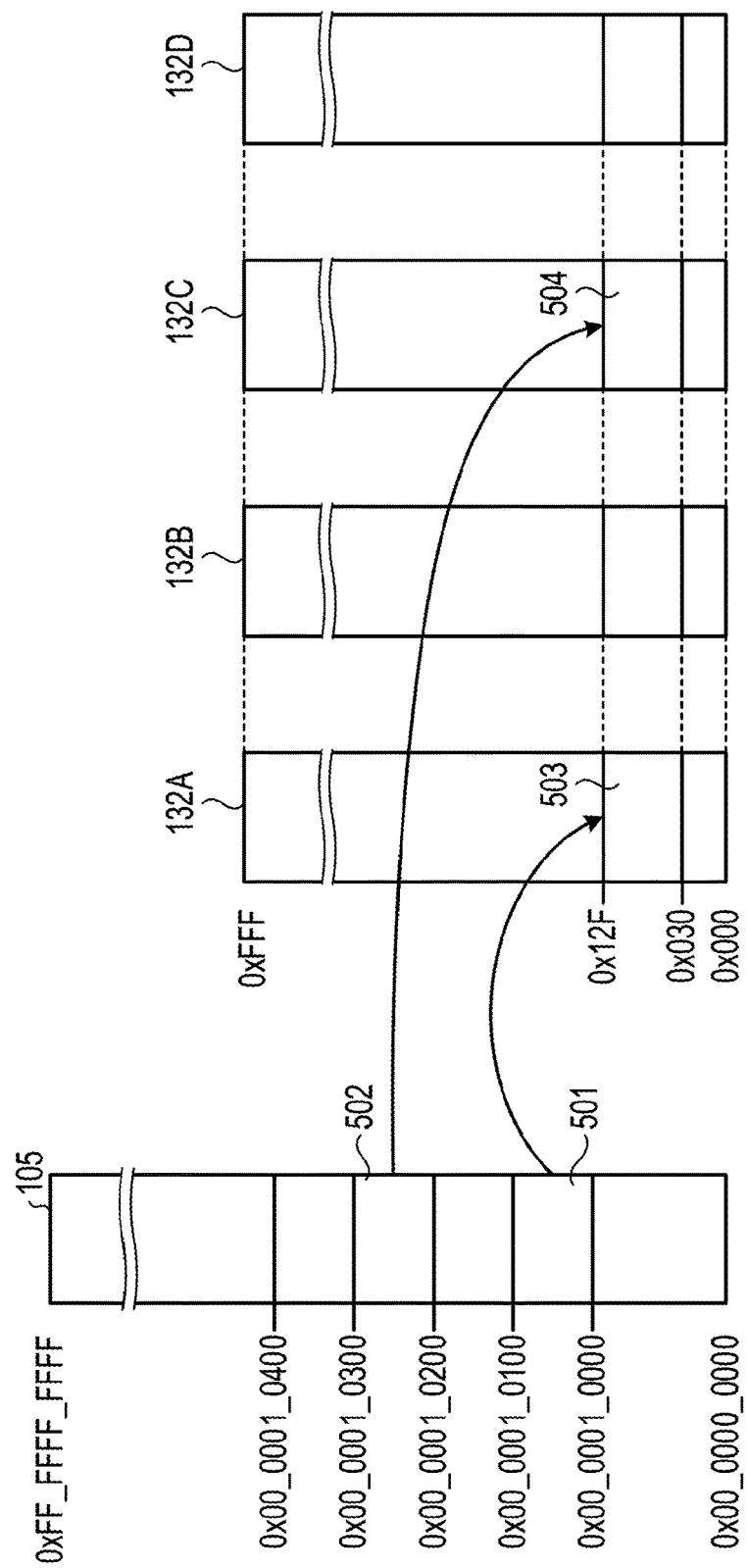
FIG. 12 is a view for explaining a load request process.

A request of opcode[1:0]=2'b00, destLSU[3:0]=4'b0101, RegAddr[11:0]=0x030, MemAddr[37:0]=0x00_0001_0000 and length[11:0]=0x100 will be described. The request is a load request that requests a memory access as illustrated in FIG. 12. FIG. 12 is a view for explaining a load request process. Specifically, this request transfers data from 0x00_0001_0000 to 0x00_0001_00FF on the memory 105 to the 0x030-th to 0x12F-th registers of the register file 132A of the core ###0. The request also transfers data from 0x00_0001_0200 to 0x00_0001_02FF on the memory 105 to the 0x030-th to 0x12F-th registers of the register file 132 C of the core ###2.

Figure 13:
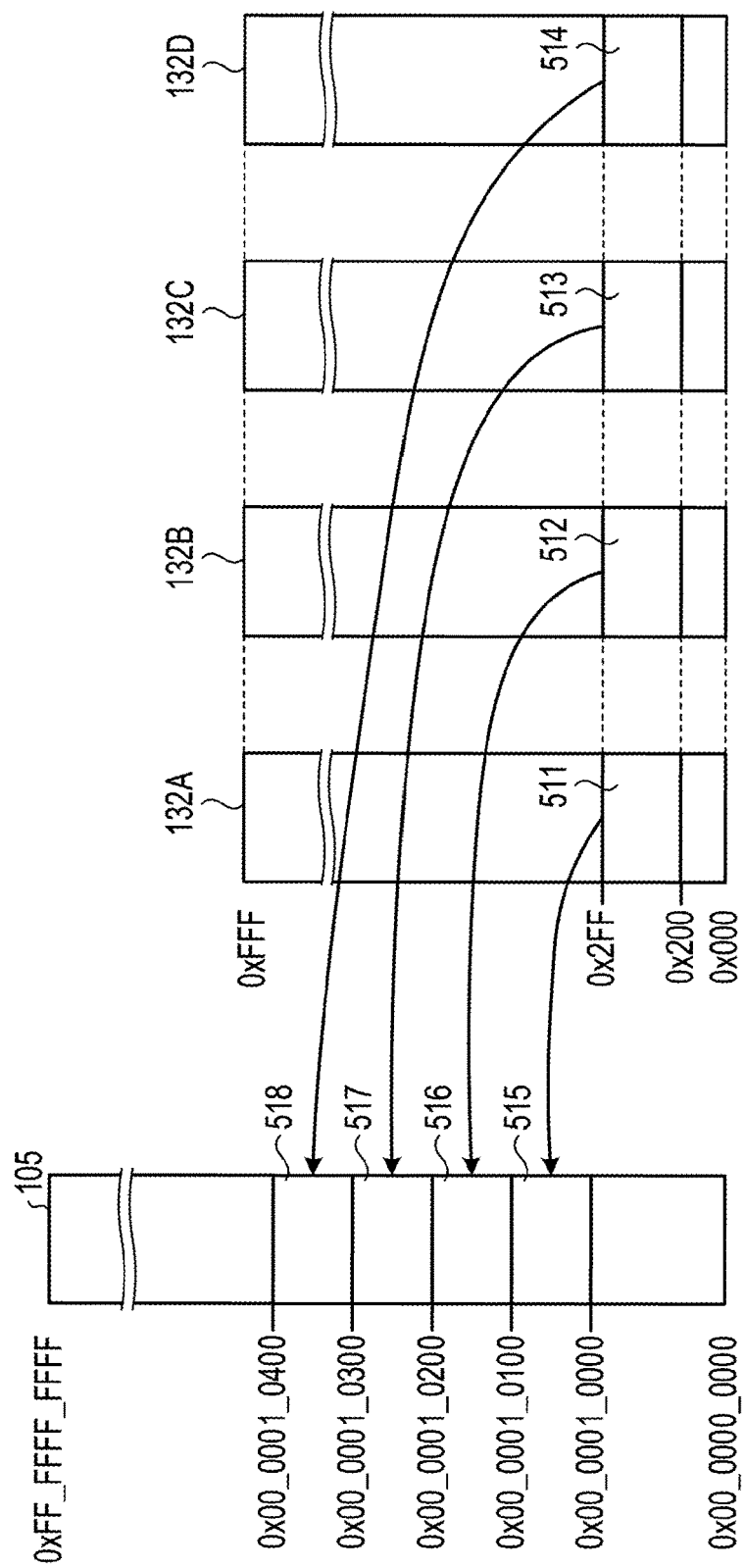
FIG. 13 is a view for explaining a store request process.

Further, a request of opcode[1:0]=2'b01, destLSU[3:0] =4'b1111, RegAddr[11:0]=0x200, MemAddr[37:0] =0x00_0001_0000 and length[11:0]=0x100 will be described. The request is a store request that requests a memory access as illustrated in FIG. 13. FIG. 13 is a view for explaining a store request process. Specifically, the request transfers data of the 0x200-th to 0x2FF-th registers of the register file 132A of the core ###0 to 0x00_0001_0000 to 0x00_0001_00FF on the memory 105. The request also transfers data of the 0x200-th to 0x2FF-th registers of the register file 132B of the core ###1 to 0x00_0001_0100 to 0x00_0001_01FF on the memory 105. The request also transfers data of the 0x200-th to 0x2FF-th registers of the register file 132C of the core ###2 to 0x00_0001_0200 to 0x00_0001_02FF on the memory 105. The request also transfers data of the 0x200-th to 0x2FF-th registers of the register file 132D of the core ###3 to 0x00_0001_0300 to 0x00_0001_03FF on the memory 105.

Referring back to FIG. 10, the description will be continued. When a request is input to the shift register 121, p_req_val, p_req_data[67:0], and p_req_dest[3:0] are stored in a register immediately behind the tail register storing a request, among the registers ob0 to ob7. The p_req_val is a valid signal. The p_req_data[67:0] is the data of the request. The p_req_dest[3:0] is information indicating the load store circuit 102 of the destination of the request. The p_req_dest [3:0] is information obtained by extracting p_req_data[65: 62] corresponding to destLSU[3:0] from p_req_data[67:0]. In the following description, p_req_val of the registers ob0 to ob7 will be referred to as p_ob0_val to p_ob7_val, respectively. Further, p_req_data[67:0] of the registers ob0 to ob7 will be referred to as p_ob0_data[67:0] to p_ob7_data [67:0], respectively. Further, p_req_dest[3:0] of the registers ob0 to ob7 will be referred to as p_ob0[3:0] to p_ob7[3:0], respectively.

The overtaking circuit 122 acquires p_busy_[3:0] representing the busy state of the load store circuits ##0 to ##3 from the credit management circuit 113. Further, the overtaking circuit 122 acquires p_ob0[3:0], p_ob1[3:0], p_ob2 [3:0], . . . , p_ob7[3:0] which are information indicating the destination of each request stored in the registers ob0 to ob7. Then, the overtaking circuit 122 selects a request to be issued. Then, the overtaking circuit 122 outputs p_sel[7:0] which is a signal for selecting the request to be issued.

The selector 123 has eight input paths. The selector 123 receives an input of p_ob0_data[67:0] to p_ob7_data[67:0] stored by the respective registers ob0 to ob7 through the respective input paths. In addition, the selector 123 receives an input of p_sel[7:0] from the overtaking circuit 122. Then, according to p_sel[7:0], the selector 123 selects one from p_ob0_data[67:0] to p_ob7_data[67:0] and outputs the selected one as p_sel_data[67:0]. The format of p_sel_data [67:0] is also represented by the format 50 in FIG. 11.

The selector 124 has eight input paths. The selector 124 receives an input of p_ob0[3:0] to p_ob7[3:0] stored by the respective registers ob0 to ob7 through the respective input paths. In addition, the selector 124 receives an input of p_sel[7:0] from the overtaking circuit 122. Then, according to p_sel [7:0], the selector 124 selects one from p_ob0[3:0] to p_ob7[3:0] and outputs the selected one as p_sel_dest[3: 0].

Figure 14:
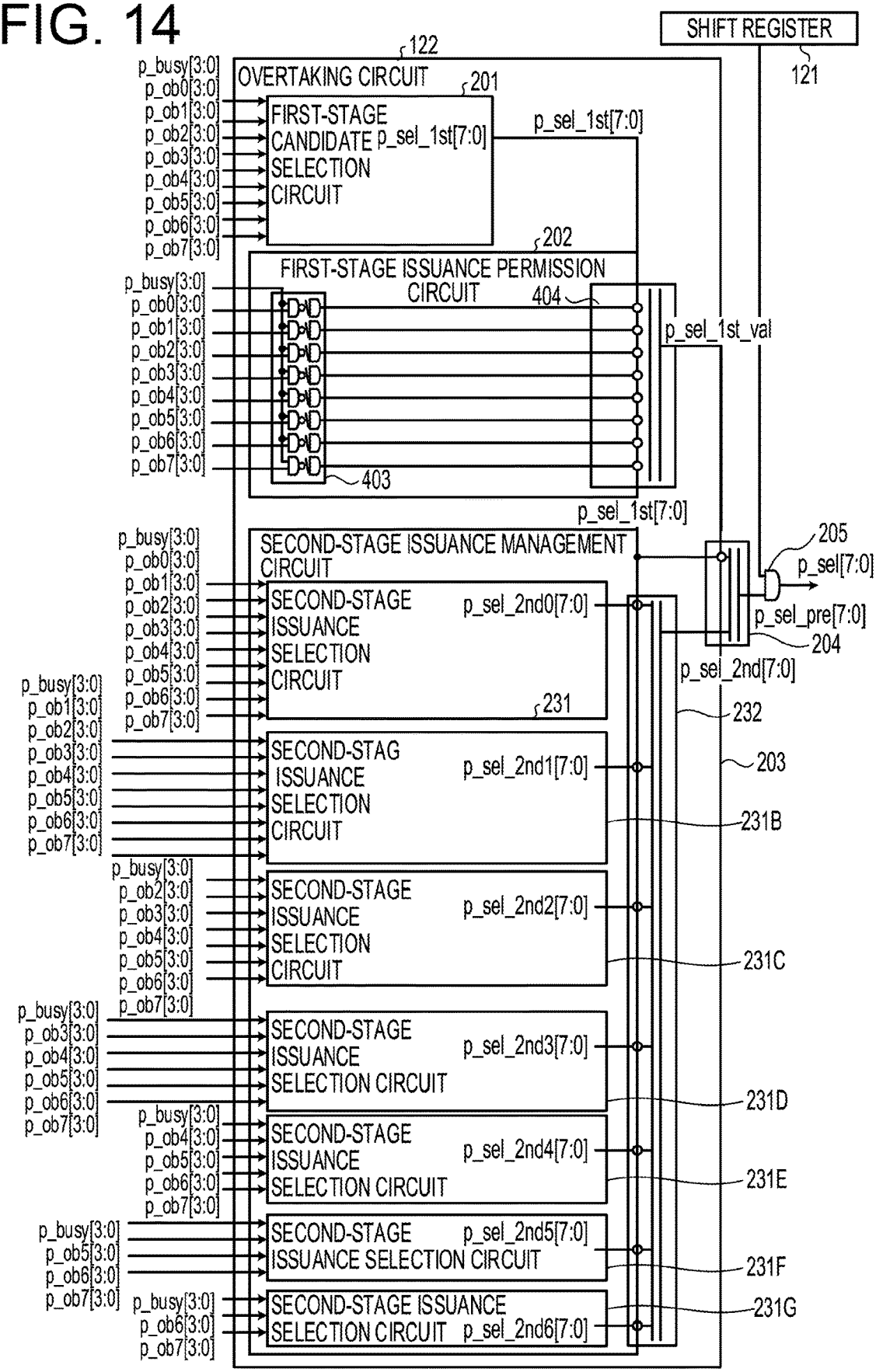
FIG. 14 is a block diagram of an overtaking circuit in an overtaking instruction queue having an eight-stage shift register.

Next, the overtaking circuit 122 in the overtaking instruction queue 112 having the eight-stage shift register 121 will be described with reference to FIG. 14. FIG. 14 is a block diagram of an overtaking circuit in an overtaking instruction queue having an eight-stage shift register.

The first-stage candidate selection circuit 201 acquires p_busy[3:0] from the credit management circuit 113. In addition, the first-stage candidate selection circuit 201 acquires p_ob0[3:0] to p_ob7[3:0] from the registers ob0 to ob7, respectively. The first-stage candidate selection circuit 201 selects the headmost request satisfying the first-stage candidate selection condition, as the first-stage candidate.

Figure 15:
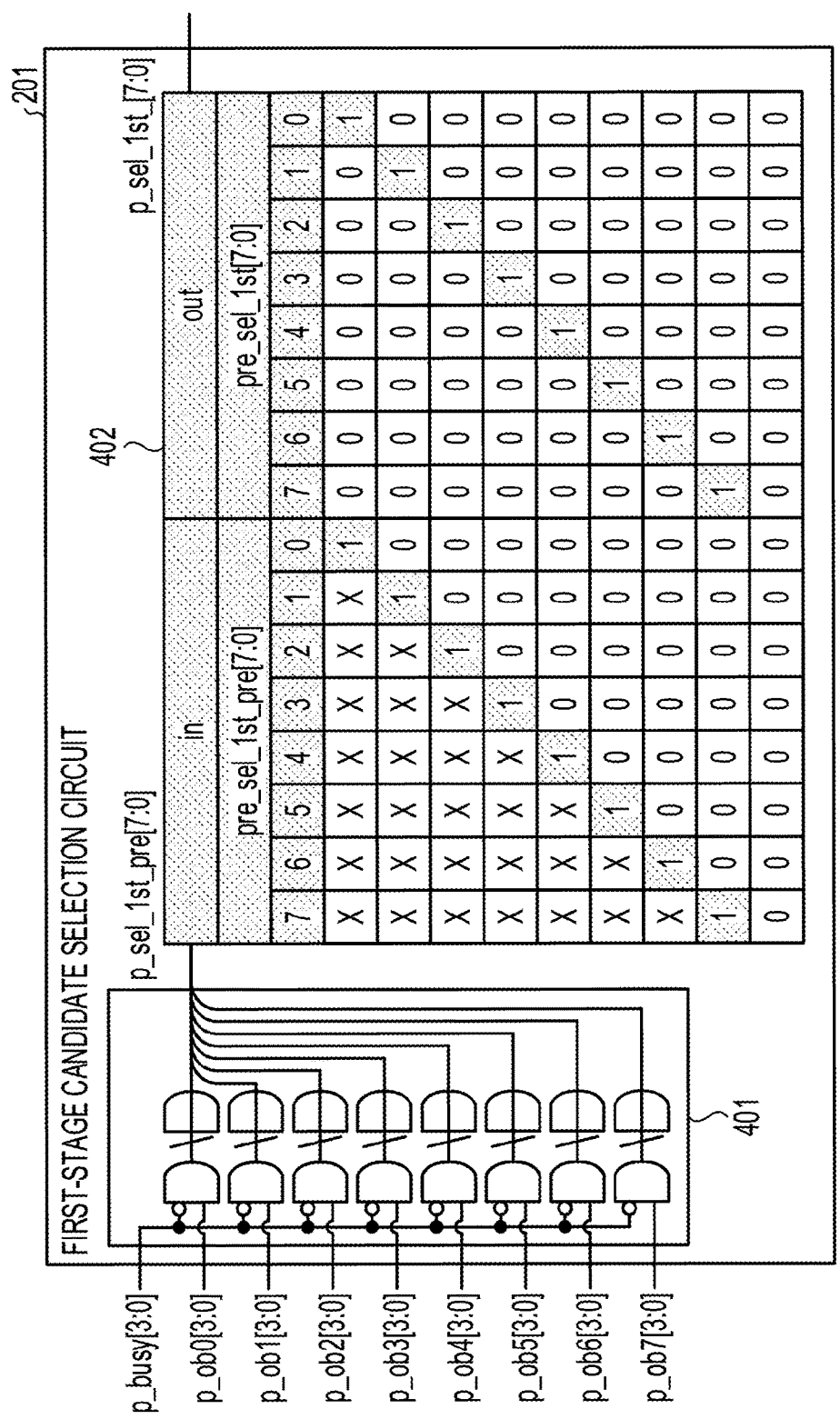
FIG. 15 is a circuit diagram of a first-stage candidate selection circuit in the eight-stage shift register.

For example, the first-stage candidate selection circuit 201 has the logic circuit 401 and the truth table 402 illustrated in FIG. 15. FIG. 15 is a circuit diagram of the first-stage candidate selection circuit in the case of the eight-stage shift register. The truth table 402 is a table that receives an input of an 8-bit signal and outputs an 8-bit signal obtained by setting bits other than the High bit at the head side of the signal to Low.

The logic circuit 401 calculates the logical conjunction of a signal obtained by inverting p_busy[3:0] and each of p_ob0[3:0] to p_ob7[3:0]. Then, the logic circuit 401 calculates the logical disjunction of all the bits of the calculated logical conjunctions, and outputs a 8-bit p_sel_1s_pre[7:0] to the truth table 402. For example, when p_ob3[3:0] and p_ob5[3:0] satisfy the first-stage candidate selection condition, the logic circuit 401 outputs p_sel_1st_pre[7:0] having the third bit and the fifth bit of High.

The first-stage candidate selection circuit 201 uses the truth table 402 to acquire an output signal corresponding to p_sel_1st_pre[7:0] output from the logic circuit 401. As a result, the first-stage candidate selection circuit 201 selects the first-stage candidate. Then, the first-stage candidate selection circuit 201 outputs p_sel_1st[7:0] which is a signal representing the request of the selected first-stage candidate. For example, when the request stored in ob3 is selected as the first-stage candidate, the first-stage candidate selection circuit 201 outputs a signal in which the third bit of p_sel_1st[7:0] becomes High and the other bits become Low.

Referring back to FIG. 14, the description will be continued. The first-stage issuance permission circuit 202 includes a logic circuit 403 and a selector 404. The first-stage issuance permission circuit 202 acquires p_busy[3:0] from the credit management circuit 113. In addition, the first-stage issuance permission circuit 202 acquires p_ob0 [3:0] to p_ob7[3:0] from the registers ob0 to ob7, respectively.

The logic circuit 403 determines whether or not each of the requests stored in the registers ob0 to ob7 satisfies the first-stage issuance permission condition. Then, the logic circuit 403 outputs to the eight paths a signal indicating whether or not each request satisfies the first-stage issuance permission condition. In this case, the logic circuit 403 outputs High when the first-stage issuance permission condition is satisfied, and outputs Low when the first-stage issuance permission condition is not satisfied.

Next, the selector 404 receives an input of the determination result of the first-stage issuance permission condition which has been output from the logic circuit 403. In addition, the selector 404 receives an input of p_sel_1st[7:0] representing the request of the first-stage candidate, from the first-stage candidate selection circuit 201. Then, the selector 404 selects the determination result of the first-stage issuance permission condition which has been output from the logic circuit 403, according to p_sel_1st[7:0]. Then, the selector 404 uses the selection result to output p_sel_1st_val which is information indicating whether to make the issuance of the request of the first-stage candidate valid or invalid. The selector 404 sets p_sel_1st_val to High when the issuance of the request of the first-stage candidate is valid. When the issuance of the request of the first-stage candidate is invalid, the selector 404 sets p_sel_1st_val to Low.

The second-stage issuance management circuit 203 includes second-stage issuance selection circuits 231A to 231G which are the seven second-stage issuance selection circuits 231. FIGS. 16A to 16G are circuit diagrams of the second-stage issuance selection 231A to 231G.

The second-stage issuance selection circuit 231A illustrated in FIG. 16A performs the second-stage issuance selection when the request stored by the register ob0 becomes the first-stage candidate. The second-stage issuance selection circuit 231A includes a logic circuit 405A and a truth table 406A.

The logic circuit 405A acquires p_busy[3:0] from the credit management circuit 113. Further, the logic circuit 405A acquires p_ob0[3:0] to p_ob7[3:0] from the registers ob0 to ob7, respectively. Then, the logic circuit 405A calculates the logical disjunction of p_busy[3:0] and p_ob0 [3:0]. Next, the logic circuit 405A calculates the logical conjunction of the calculated logical disjunction and each of p_ob1[3:0] to p_ob7[3:0]. Next, the logic circuit 405A calculates the logical conjunction of all the bits obtained by inverting the calculated logical conjunction. As a result, the logic circuit 405A determines whether or not each of p_ob1 [3:0] to p_ob7[3:0] satisfies the second-stage issuance selection condition. Then, the logic circuit 405A outputs p_sel_2nd0_pre[7:1] which is a 7-bit signal representing one that satisfies the second-stage issuance selection condition among p_ob1[3:0] to p_ob7[3:0]. For example, when p_ob1 [3:0] and p_ob3[3:0] satisfy the second-stage issuance selection condition, the logic circuit 405A sets the first bit and the third bit of p_sel_2nd0_pre[7:1] to High.

The truth table 406A is a table in which an 8-bit signal, obtained by adding one-bit of Low bit to the head of an input 7-bit signal with bits other than the High bit on the head side of the signal set to Low, is an output signal.

The second-stage issuance selection circuit 231A uses the truth table 460A to acquire p_sel_2nd[7:0] which is an output signal corresponding to p_sel_2nd0_pre[7:1]. As a result, the second-stage issuance selection circuit 231A selects the headmost request among the requests that are stored in the registers ob1 to ob7 behind the register ob0 and satisfy the second-stage issuance selection condition, as a request to be issued. Then, the second-stage issuance selection circuit 231A outputs p_sel_2nd[7:0] which is a signal representing the selected request. For example, when the request stored in ob3 is selected as a request to be issued, the second-stage issuance selection circuit 231A outputs a signal in which the third bit of p_sel_2nd[7:0] is High and the other bits are Low.

Figure 16B:
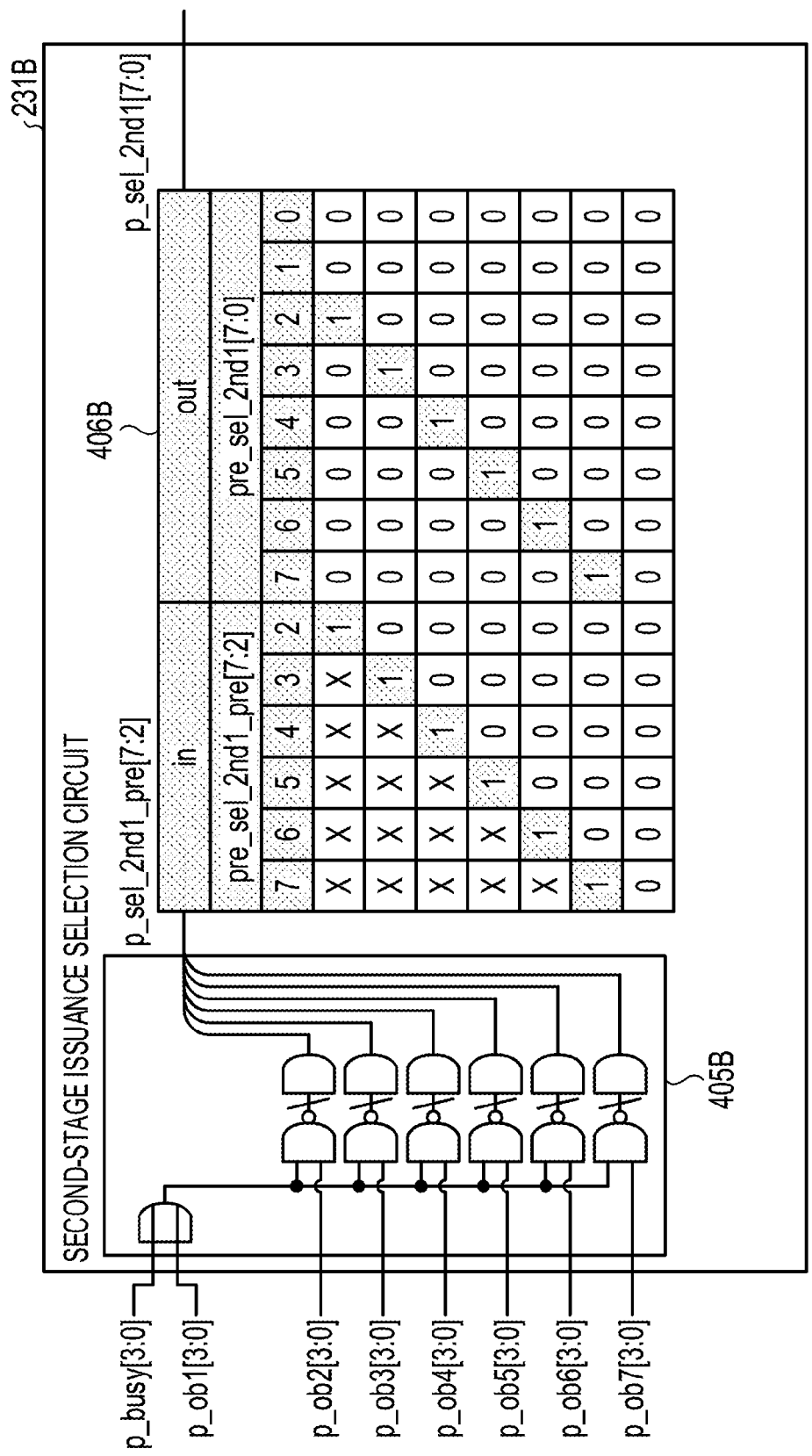

The second-stage issuance selection circuit 231B illustrated in FIG. 16B performs the second-stage issuance selection when the request stored by the register ob1 becomes the first-stage candidate. The second-stage issuance selection circuit 231B includes a logic circuit 405B and a truth table 406B.

The logic circuit 405B acquires p_busy[3:0] from the credit management circuit 113. Further, the logic circuit 405B acquires p_ob1[3:0] to p_ob7[3:0] from the registers ob1 to ob7, respectively. Then, the logic circuit 405B calculates the logical disjunction of p_busy[3:0] and p_ob1 [3:0]. Next, the logic circuit 405B calculates the logical conjunction of the calculated logical disjunction and each of p_ob2[3:0] to p_ob7[3:0]. Next, the logic circuit 405B calculates the logical conjunction of all the bits obtained by inverting the calculated logical conjunction. As a result, the logic circuit 405B determines whether or not each of p_ob2 [3:0] to p_ob7[3:0] satisfies the second-stage issuance selection condition. Then, the logic circuit 405B outputs p_sel_2nd1_pre[7:2] which is a 6-bit signal representing one that satisfies the second-stage issuance selection condition among p_ob2[3:0] to p_ob7[3:0]. For example, when p_ob2 [3:0] and p_ob5[3:0] satisfy the second-stage issuance selection condition, the logic circuit 405B sets the second bit and the fifth bit of p_sel_2nd1_pre[7:2] to High.

The truth table 406B is a table in which an 8-bit signal, obtained by adding 2 bits of Low bit to the head of an input 6-bit signal with bits other than the High bit on the head side of the signal set to Low, is an output signal.

The second-stage issuance selection circuit 231B uses the truth table 460B to acquire p_sel_2nd1[7:0] which is an output signal corresponding to p_sel_2nd1_pre[7:2]. As a result, the second-stage issuance selection circuit 231B selects the head request among the requests that are stored in the registers ob2 to ob7 behind the register ob1 and satisfy the second-stage issuance selection condition, as a request to be issued. Then, the second-stage issuance selection circuit 231B outputs p_sel_2nd1[7:0] which is a signal representing the selected request.

Figure 16C:
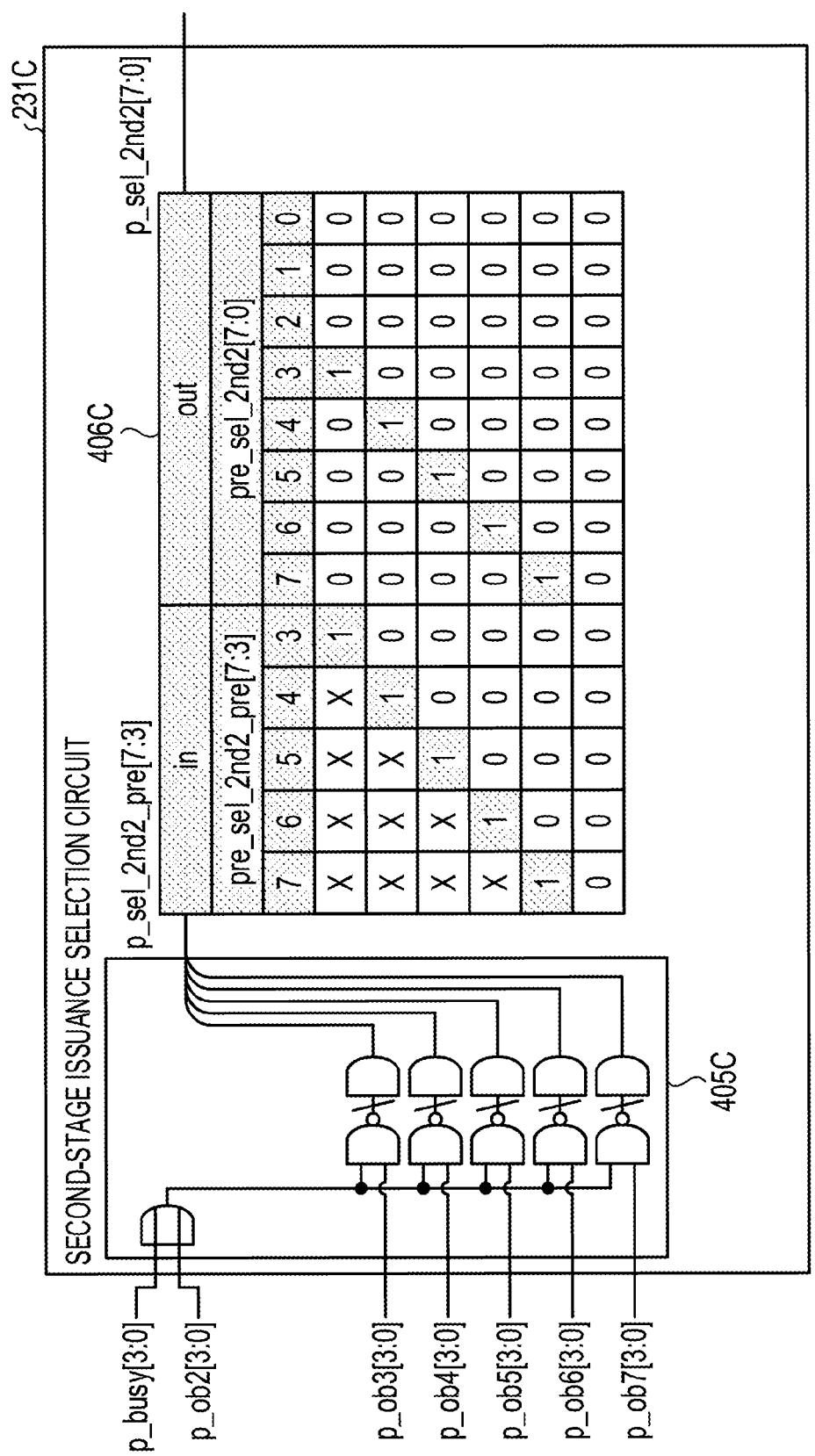

The second-stage issuance selection circuit 231C illustrated in FIG. 16C performs the second-stage issuance selection when the request stored by the register ob2 becomes the first-stage candidate. The second-stage issuance selection circuit 231C includes a logic circuit 405C and a truth table 406C.

The logic circuit 405C acquires p_busy[3:0] from the credit management circuit 113. Further, the logic circuit 405C acquires p_ob2[3:0] to p_ob7[3:0] from the registers ob2 to ob7, respectively. Then, the logic circuit 405C calculates the logical disjunction of p_busy[3:0] and p_ob2 [3:0]. Next, the logic circuit 405C calculates the logical conjunction of the calculated logical disjunction and each of p_ob3[3:0] to p_ob7[3:0]. Next, the logic circuit 405C calculates the logical conjunction of all the bits obtained by inverting the calculated logical conjunction. As a result, the logic circuit 405C determines whether or not each of p_ob3 [3:0] to p_ob7[3:0] satisfies the second-stage issuance selection condition. Then, the logic circuit 405C outputs p_sel_2nd2_pre[7:3] which is a 5-bit signal representing one that satisfies the second-stage issuance selection condition among p_ob3[3:0] to p_ob7[3:0]. For example, when p_ob3 [3:0] and p_ob5[3:0] satisfy the second-stage issuance selection condition, the logic circuit 405C sets the third bit and the fifth bit of p_sel_2nd2_pre[7:3] to High.

The truth table 406C is a table in which an 8-bit signal, obtained by adding 3 bits of Low bit to the head of an input 5-bit signal with bits other than the High bit on the head side of the signal set to Low, is an output signal.

The second-stage issuance selection circuit 231C uses the truth table 460C to acquire p_sel_2nd2[7:0] which is an output signal corresponding to p_sel_2nd2_pre[7:3]. As a result, the second-stage issuance selection circuit 231C selects the head request among the requests that are stored in the registers ob3 to ob7 behind the register ob2 and satisfy the second-stage issuance selection condition, as a request to be issued. Then, the second-stage issuance selection circuit 231C outputs p_sel_2nd2[7:0] which is a signal representing the selected request.

The second-stage issuance selection circuit 231D illustrated in FIG. 16D performs the second-stage issuance selection when the request stored by the register ob3 becomes the first-stage candidate. The second-stage issuance selection circuit 231D includes a logic circuit 405D and a truth table 406D.

The logic circuit 405D acquires p_busy[3:0] from the credit management circuit 113. Further, the logic circuit 405D acquires p_ob3[3:0] to p_ob7[3:0] from the registers ob3 to ob7, respectively. Then, the logic circuit 405D calculates the logical disjunction of p_busy[3:0] and p_ob3[3:0]. Next, the logic circuit 405D calculates the logical conjunction of the calculated logical disjunction and each of p_ob4[3:0] to p_ob7[3:0]. Next, the logic circuit 405D calculates the logical conjunction of all the bits obtained by inverting the calculated logical conjunction. As a result, the logic circuit 405D determines whether or not each of p_ob4[3:0] to p_ob7[3:0] satisfies the second-stage issuance selection condition. Then, the logic circuit 405D outputs p_sel_2nd3_pre[7:4] which is a 4-bit signal representing one that satisfies the second-stage issuance selection condition among p_ob4[3:0] to p_ob7[3:0]. For example, when p_ob4[3:0] and p_ob5[3:0] satisfy the second-stage issuance selection condition, the logic circuit 405D sets the fourth bit and the fifth bit of p_sel_2nd3_pre[7:4] to High.

The truth table 406D is a table in which an 8-bit signal, obtained by adding Obits of Low bit to the head of an input 4-bit signal with bits other than the High bit on the head side of the signal set to Low, is an output signal.

The second-stage issuance selection circuit 231D uses the truth table 460D to acquire p_sel_2nd3[7:0] which is an output signal corresponding to p_sel_2nd3_pre[7:4]. As a result, the second-stage issuance selection circuit 231D selects the headmost request among the requests that are stored in the registers ob4 to ob7 behind the register ob3 and satisfy the second-stage issuance selection condition, as a request to be issued. Then, the second-stage issuance selecting circuit 231D outputs p_sel_2nd3[7:0] which is a signal representing the selected request.

Figure 16E:
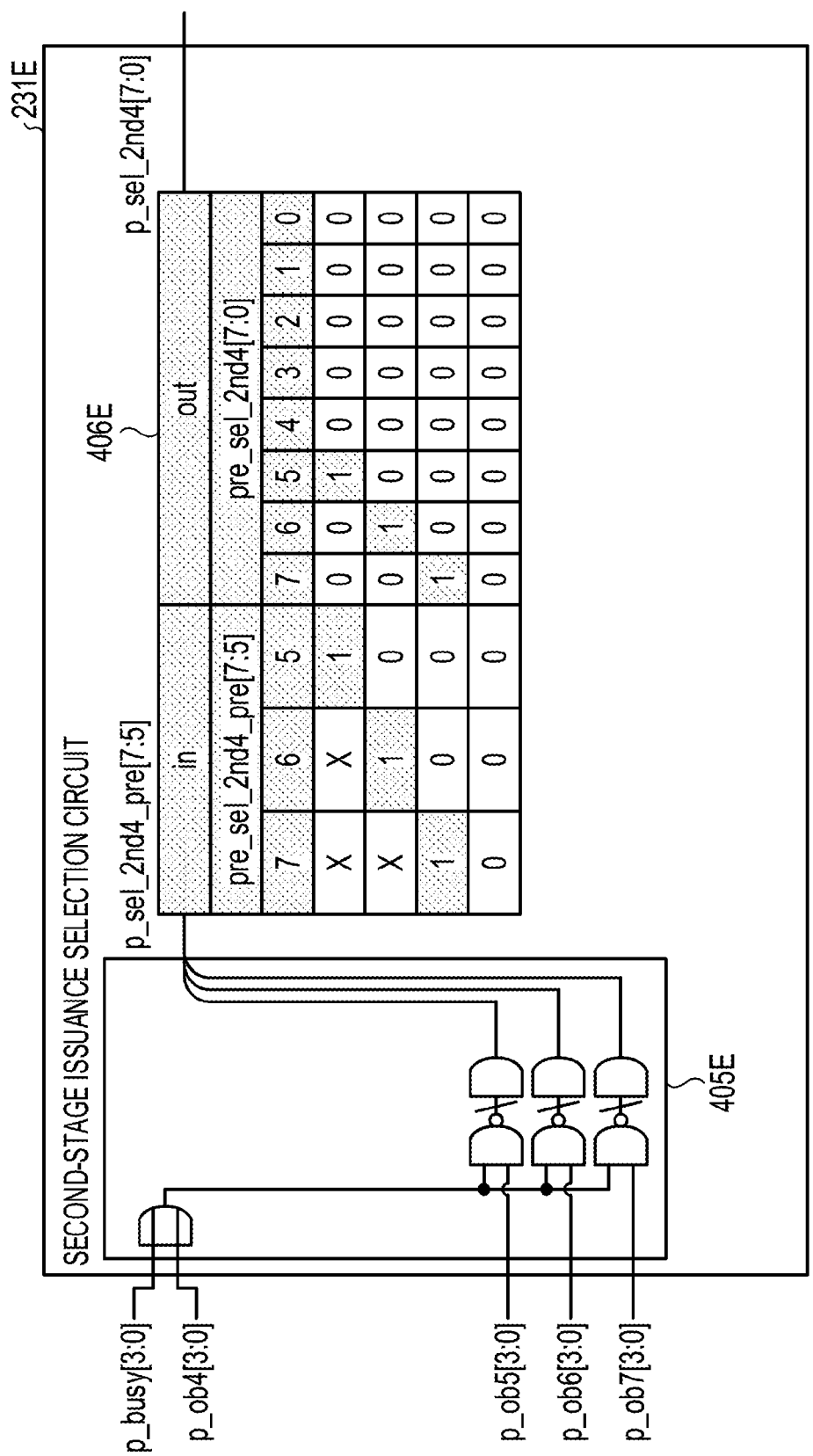

The second-stage issuance selection circuit 231E illustrated in FIG. 16E performs the second-stage issuance selection when the request stored by the register ob4 becomes the first-stage candidate. The second-stage issuance selection circuit 231E includes a logic circuit 405E and a truth table 406E.

The logic circuit 405E acquires p_busy[3:0] from the credit management circuit 113. Further, the logic circuit 405E acquires p_ob4[3:0] to p_ob7[3:0] from the registers ob4 to ob7, respectively. Then, the logic circuit 405E calculates the logical disjunction of p_busy[3:0] and p_ob4[3:0]. Next, the logic circuit 405E calculates the logical conjunction of the calculated logical disjunction and each of p_ob5[3:0] to p_ob7[3:0]. Next, the logic circuit 405E calculates the logical conjunction of all the bits obtained by inverting the calculated logical conjunction. As a result, the logic circuit 405E determines whether or not each of p_ob5[3:0] to p_ob7[3:0] satisfies the second-stage issuance selection condition. Then, the logic circuit 405E outputs p_sel_2nd4_pre[7:5] which is a 3-bit signal representing one that satisfies the second-stage issuance selection condition among p_ob5[3:0] to p_ob7[3:0]. For example, when p_ob5[3:0] and p_ob6[3:0] satisfy the second-stage issuance selection condition, the logic circuit 405E sets the fifth bit and the sixth bit of p_sel_2nd4_pre[7:5] to High.

The truth table 406E is a table in which an 8-bit signal, obtained by adding 5 bits of Low bit to the head of an input 3-bit signal with bits other than the High bit on the head side of the signal set to Low, is an output signal.

The second-stage issuance selection circuit 231E uses the truth table 460E to acquire p_sel_2nd4[7:0] which is an output signal corresponding to p_sel_2nd4_pre[7:5]. As a result, the second-stage issuance selection circuit 231E selects the headmost request among the requests that are stored in the registers ob5 to ob7 behind the register ob4 and satisfy the second-stage issuance selection condition, as a request to be issued. Then, the second-stage issuance selection circuit 231E outputs p_sel_2nd4[7:0] which is a signal representing the selected request.

The second-stage issuance selection circuit 231F illustrated in FIG. 16F performs the second-stage issuance selection when the request stored by the register ob5 becomes the first-stage candidate. The second-stage issuance selection circuit 231F includes a logic circuit 405F and a truth table 406F.

The logic circuit 405F acquires p_busy[3:0] from the credit management circuit 113. Further, the logic circuit 405F acquires p_ob5[3:0] to p_ob7[3:0] from the registers ob5 to ob7, respectively. Then, the logic circuit 405F calculates the logical disjunction of p_busy[3:0] and p_ob5[3:0]. Next, the logic circuit 405F calculates the logical conjunction of the calculated logical disjunction and each of p_ob6[3:0] to p_ob7[3:0]. Next, the logic circuit 405F calculates the logical conjunction of all the bits obtained by inverting the calculated logical conjunction. As a result, the logic circuit 405F determines whether or not each of p_ob6[3:0] to p_ob7[3:0] satisfies the second-stage issuance selection condition. Then, the logic circuit 405F outputs p_sel_2nd5_pre[7:6] which is a 2-bit signal representing one that satisfies the second-stage issuance selection condition among p_ob6[3:0] to p_ob7[3:0]. For example, when p_ob6[3:0] and p_ob7[3:0] satisfy the second-stage issuance selection condition, the logic circuit 405F sets the sixth bit and the seventh bit of p_sel_2nd5_pre[7:6] to High.

The truth table 406F is a table in which an 8-bit signal, obtained by adding a 6-bit Low bit to the head of an input 2-bit signal with bits other than the High bit on the head side of the signal set to Low, is an output signal.

The second-stage issuance selection circuit 231F uses the truth table 460F to acquire p_sel_2nd5[7:0] which is an output signal corresponding to p_sel_2nd5_pre[7:6]. As a result, the second-stage issuance selection circuit 231F selects the headmost request among the requests that are stored in the registers ob6 to ob7 behind the register ob5 and satisfy the second-stage issuance selection condition, as a request to be issued. Then, the second-stage issuance selecting circuit 231F outputs p_sel_2nd5[7:0] which is a signal representing the selected request.

Figure 16G:
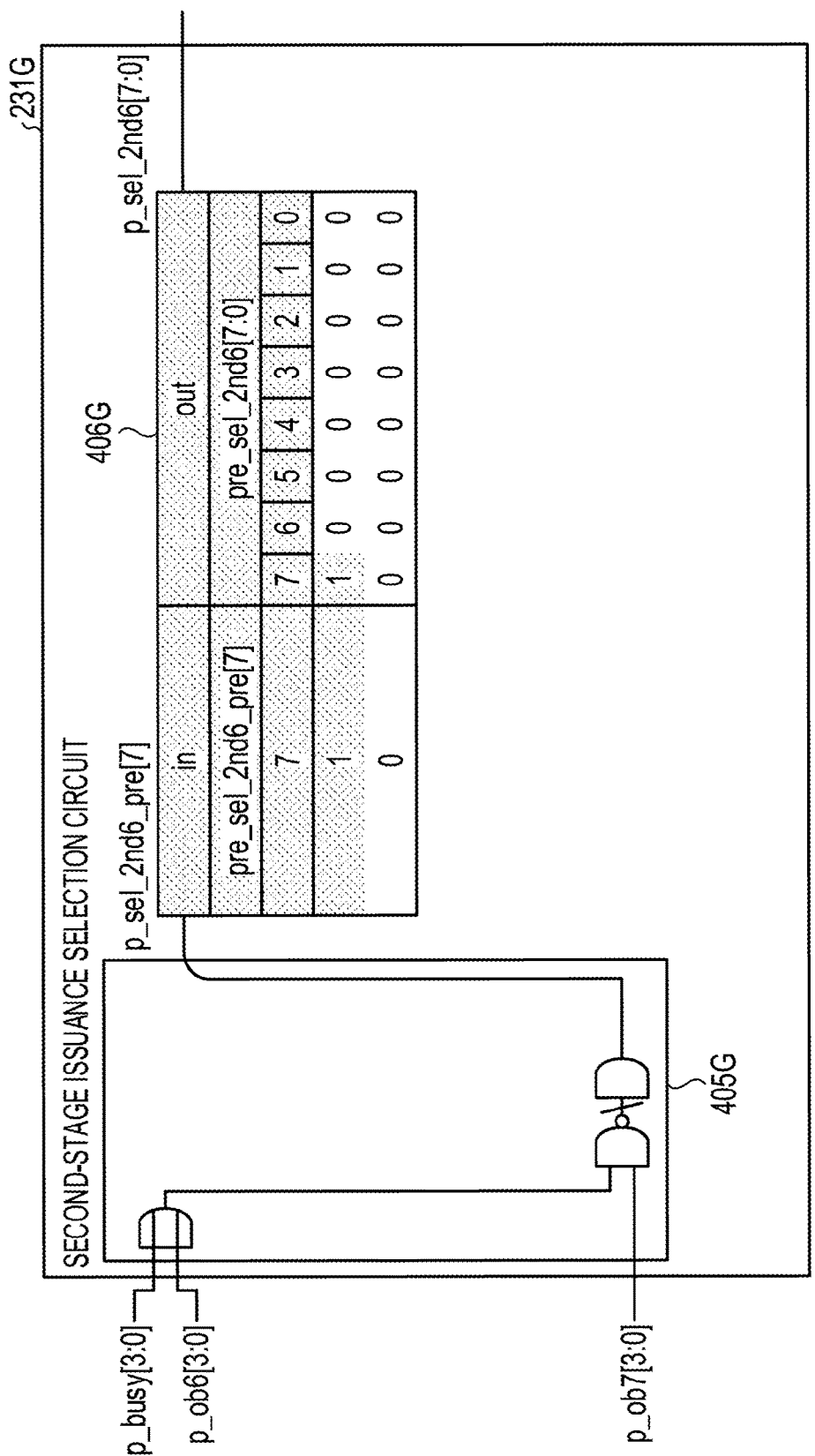

The second-stage issuance selection circuit 231G illustrated in FIG. 16G performs the second-stage issuance selection when the request stored by the register ob6 becomes the first-stage candidate. The second-stage issuance selection circuit 231G includes a logic circuit 405G and a truth table 406G.

The logic circuit 405G acquires p_busy[3:0] from the credit management circuit 113. Further, the logic circuit 405G acquires p_ob6[3:0] and p_ob7[3:0] from the registers ob6 and ob7, respectively. Then, the logic circuit 405G calculates the logical disjunction of p_busy[3:0] and p_ob6 [3:0]. Next, the logic circuit 405G calculates the logical conjunction of the calculated logical disjunction and p_ob7 [3:0]. Next, the logic circuit 405G calculates the logical conjunction of all the bits obtained by inverting the calculated logical conjunction. As a result, the logic circuit 405G determines whether or not p_ob7[3:0] satisfies the second-stage issuance selection condition. Then, the logic circuit 405G outputs p_sel_2nd6_pre[7] which is a one-bit signal representing p_ob7[3:0]. When p_ob7[3:0] satisfies the second-stage issuance selection condition, the logic circuit 405G sets the seventh bit of p_sel_2nd6_pre[7:7] to High.

The truth table 406G is a table in which an 8-bit signal, obtained by adding 7 bits of Low bit to an input one-bit signal, is an output signal.

The second-stage issuance selection circuit 231G uses the truth table 460G to acquire p_sel_2nd6[7:0] which is an output signal corresponding to p_sel_2nd6_pre[7]. As a result, the second-stage issuance selection circuit 231G selects the request stored in the register ob7 behind the register ob6, as a request to be issued. Then, the second-stage issuance selection circuit 231G outputs p_sel_2nd6[7:0] which is a signal representing the selected request.

Referring back to FIG. 14, the description will be continued. When p_sel_1st_val is High, the selector 204 outputs the input p_sel_1st[7:0] as p_sel_pre[7:0]. Meanwhile, when p_sel_1st_val is Low, p_sel_2nd[7:0] output from the second-stage issuance management circuit 203 is output as p_sel_pre[7:0].

The AND circuit 205 receives an input of an 8-bit valid signal representing p_ob0_val to p_ob7_val with respective bits, from the shift register 121. Further, the AND circuit 205 receives an input of p_sel_pre[7:0]. Then, the AND circuit 205 calculates the logical conjunction of the valid signal and p_sel_pre[7:0] and outputs the calculated logical conjunction as p_sel[7:0].

Figure 17:
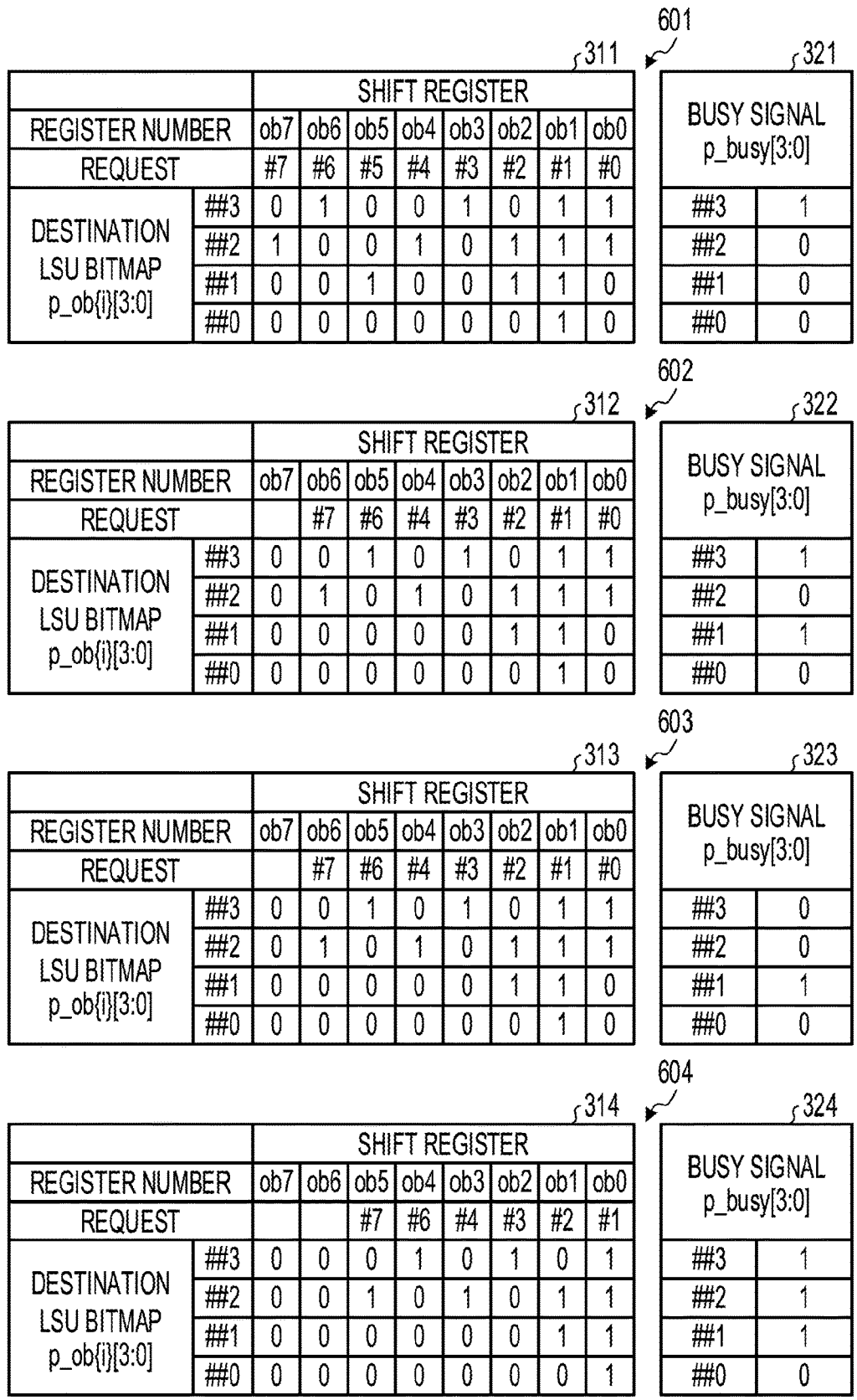
FIG. 17 is a view for explaining an example of a process of selecting requests stored in an eight-stage shift register.

Next, the specific flow of the request selection by the overtaking instruction queue 112 having the eight-stage shift register 121 will be described with reference to FIG. 17. FIG. 17 is a view for explaining an example of a process of selecting a request stored in an eight-stage shift register. The destination LSU bitmap in FIG. 16 is information indicating whether or not each of the load store circuits ##0 to ##3 is a destination in each request.

Requests #1 to #7 are stored in the registers ob0 to ob7 of the shift register 121, respectively, as illustrated in a table 311 of a state 601. In this state, the load store circuit ##3 is busy as indicated by the busy signal in a table 321.

Therefore, the overtaking instruction queue 112 selects a request addressed to one of the load store circuits ##0 to ##2. In this case, the overtaking instruction queue 112 selects the requests #0 to #2, #4, #5, and #6 as requests satisfying the first-stage candidate selection condition. Next, the overtaking instruction queue 112 sets the headmost request #0 among the selected requests #0 to #2, #4, #5, and #6, as the first-stage candidate. In this case, since the destinations of the request #0 include the load store circuit ##3, the overtaking instruction queue 112 does not issue the request #0 as the first-stage candidate. Therefore, the overtaking instruction queue 112 specifies a request for which none of the destination load store circuits 102 is in the busy state, among the requests #1 to #7 stored in the registers ob1 to ob7 behind the register ob0. Here, the overtaking instruction queue 112 specifies the requests #2, #4, #5, and #7. Further, the overtaking instruction queue 112 selects a request of which destination does not overlap with those of the request #0, among the specified requests #2, #4, #5, and #7. In this case, the overtaking instruction queue 112 selects the request #5 as a request satisfying the second-stage issuance selection condition. Since one request is selected, the overtaking instruction queue 112 issues the request #5.

When the request #5 is issued, the overtaking instruction queue 112 transits to a state 602. Since the request #5 has been issued, the register ob5 becomes vacant. Therefore, as illustrated in a table 312, the positions of the requests #6 and #7 are changed such that the requests #6 and #7 are filled in the head. Further, as indicated by the busy signal in the table 321, in addition to the load store circuit ##3, the load store circuit ##1 which is the destination of the request #1 becomes the busy state.

Further, while the overtaking instruction queue 112 is in the state 602, the load store circuit ##3 completes the request processing. Since the busy state of the load store circuit ##3 is released, the overtaking instruction queue 112 transits to a state 603. In this case, a table 313 has the same contents as the table 312 of the state 602. Meanwhile, as indicated by the busy signal in the table 323, the busy state of the load store circuit ##3 is released.

Then, in the state 603, the overtaking instruction queue 112 selects a request addressed to one of the load store circuit ##0, ##2, and ##3. In this case, the overtaking instruction queue 112 selects all of the requests #0 to #4, #6, and #7 as requests satisfying the first-stage candidate selection condition. Next, the overtaking instruction queue 112 sets the headmost request #0 among the selected requests #0 to #4, #6, and #7, as the first-stage candidate. In this case, since the destinations of the request #0 do not include the load store circuit ##1, the overtaking instruction queue 112 issues the request #0 as the first-stage candidate.

When the request #0 is issued, the overtaking instruction queue 112 makes a transition to a state 604. Since the request #0 has been issued, the register ob0 becomes vacant. Therefore, as illustrated in a table 314, the positions of the requests #2 to #4, #6, and #7 are changed such that the requests #2 to #4, #6, and #7 are filled in the head. Further, as indicated by the busy signal in the table 324, in addition to the load store circuit ##1, the load store circuits ##2 and ##3 which are the destinations of the request #0 becomes the busy state.

Here, in the present embodiment, the second-stage issuance management circuit 203 predicts all the cases where each request is selected as the first-stage candidate, and executes the second-stage issuance selecting processes that correspond the respective cases in parallel. Then, after the first-stage candidate is selected, the second-stage issuance management circuit 203 selects the result of the second-stage issuance selection corresponding to the selected first-stage candidate. As a result, it is possible to reduce the number of logic gates of the second-stage issuance selecting process. However, when it is acceptable that the number of logic gates of the second-stage issuance selecting process is increased to some extent, the first-stage candidate is determined without the prediction, and then, the second-stage issuance selecting process corresponding to the first-stage candidate may be performed.

The multicore arithmetic processor 100 mounted on the PCI device 15 has been described. However, even when the multicore arithmetic processor 100 is installed at another location, the multicore arithmetic processor 100 may have the same functions to achieve the same effects. For example, when the CPU 11 is the multicore arithmetic processor 100 and has the overtaking instruction queue 112, the CPU 11 may have the same functions.

As described above, the instruction issuance circuit according to the present embodiment is configured such that, among the requests stored in the shift register, the headmost request for which any one of the destination load store circuits is not in the busy state is set as the first-stage candidate. Next, when the request of the first-stage candidate is issuable, the instruction issuance circuit according to the present embodiment issues the request of the first-stage candidate. Meanwhile, when the request of the first-stage candidate is not issuable, the instruction issuance circuit according to the present embodiment specifies issuable requests of which destinations do not overlap with those of the request of the first-stage candidate, among the requests stored in the registers behind the request of the first-stage candidate. Then, the instruction issuance circuit according to the present embodiment issues the headmost request among the specified requests. As a result, it is possible to efficiently issue a request of a memory access instruction while suppressing the occurrence of the live lock and to maintain fairness in request selection. In addition, by suppressing the occurrence of the live lock, it is unnecessary to take measures against the live lock by software or a disturbance circuit. Further, by predicting the first-stage candidate and performing the second-stage selecting process, it is possible to reduce the number of logic gates and to suppress the occurrence of the live lock with the simple configuration. In this manner, the occurrence of the live lock may be easily suppressed, thereby improving the processing performance of the entire multicore arithmetic processor.

Furthermore, the instruction issuance circuit that controls the order of memory access instructions has been described. However, the present disclosure is not limited thereto as long as it is a transaction having a one-input multi-output destination. For example, the following configuration may be used. A description will be given of a case where one requester issues a unicast or multicast transaction to a plurality of responders. In this case, the requester corresponds to the instruction issuance circuit 101 and the responder corresponds to the load store circuit 102. The requester has an internal queue and a queue control circuit, and manages a transaction. The queue corresponds to the shift register 121, and the queue control circuit corresponds to the overtaking circuit 122. The control circuit controls an overtaking of the transaction which is a process of selecting and issuing an issuable transaction from transactions other than the head of the queue. In this case, the control circuit determines a transaction to be issued using the same logic as used by the overtaking circuit 122 described in the above embodiment. In this case as well, it is possible to suppress the occurrence of the live lock.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the present invention. Although the embodiments of the present invention have been described in detail, it should be understood that the various changes, substitutions, and alterations could be made hereto without departing from the spirit and scope of the invention.

What is claimed is:
1. An arithmetic processing apparatus comprising:
a storage circuit configured to store a plurality of transactions each having one or more destinations; and
a processor coupled to the storage circuit and configured to:
select a first transaction among the transactions stored in the storage circuit based on a state of a destination of each of the transactions,
determine whether the first transaction is issuable,
select a second transaction based on destinations of the first transaction when it is determined that the first transaction is not issuable,
issue the first transaction when it is determined that the first transaction is issuable, and
issue the second transaction when it is determined that the first transaction is not issuable,
the storage circuit is configured to store the transactions while maintaining acquisition sequence numbers of the transactions,
the processor is configured to:
select the first transaction of which at least one destination is in a receivable state and an acquisition sequence number is smallest, among the transactions stored in the storage circuit,
determine that the first transaction is issuable when all of the destinations of the first transaction are in the receivable state, and
select the second transaction of which an acquisition sequence number is larger than that of the first transaction, and all of the destinations are in the receivable state and do not overlap with those of the first transaction.

2. The arithmetic processing apparatus according to claim 1, wherein
the storage circuit is configured to arrange and store the transactions from one end toward the other end while maintaining the acquisition sequence numbers, and
the processor is configured to:
select the first transaction of which at least one destination is in the receivable state and which exists closest to the side of the one end, among the transactions stored in the storage circuit, and
select the second transaction which exists closer to the side of the other end than the first transaction and of which all the destinations do not overlap with those of the first transaction.

3. The arithmetic processing apparatus according to claim 1, wherein the processor is configured to determine that the destination is in the receivable state when the destination has not performed a transaction processing.

4. The arithmetic processing apparatus according to claim 1, wherein the processor is configured to determine that the destination is in the receivable state when data is not stored in all entries of a queue of the destination.

5. The arithmetic processing apparatus according to claim 1, wherein the processor is configured to select a preceding transaction for each case where each of the transactions stored in the storage circuit is the first transaction, and select the preceding transaction according to the first transaction, as the second transaction.

6. The arithmetic processing apparatus according to claim 1, wherein each of the transactions is a memory access instruction addressed to an access circuit that accesses a memory.

7. A control method executed by a processor included in an arithmetic processing apparatus, the control method comprising:

storing a plurality of transactions each having one or more destinations;

selecting a first transaction among the transactions stored in a storage circuit based on a state of a destination of each of the transactions;

determining whether or not the first transaction is issuable;

selecting a second transaction based on destinations of the first transaction when it is determined that the first transaction is not issuable;

issuing the first transaction when it is determined that the first transaction is issuable; and issuing the second transaction when it is determined that the first transaction is not issuable, the storage circuit is configured to store the transactions while maintaining acquisition sequence numbers of the transactions, the control method is configured to:

select the first transaction of which at least one destination is in a receivable state and an acquisition sequence number is smallest, among the transactions stored in the storage circuit, determine that the first transaction is issuable when all of the destinations of the first transaction are in the receivable state, and select the second transaction of which an acquisition sequence number is larger than that of the first transaction, and all of the destinations are in the receivable state and do not overlap with those of the first transaction.

\* \* \* \* \*